United States Patent
Kato et al.

(10) Patent No.: US 11,891,489 B2
(45) Date of Patent: Feb. 6, 2024

(54) FILM FOR CAPACITOR AND METHOD OF PRODUCING SAME

(71) Applicant: ZEON CORPORATION, Tokyo (JP)

(72) Inventors: Ayako Kato, Tokyo (JP); Shinsuke Miyazawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 840 days.

(21) Appl. No.: 16/970,627

(22) PCT Filed: Feb. 15, 2019

(86) PCT No.: PCT/JP2019/005660
§ 371 (c)(1),
(2) Date: Aug. 18, 2020

(87) PCT Pub. No.: WO2019/167682
PCT Pub. Date: Sep. 6, 2019

(65) Prior Publication Data
US 2021/0079183 A1    Mar. 18, 2021

(30) Foreign Application Priority Data
Feb. 28, 2018    (JP) .................. 2018-035655

(51) Int. Cl.
*C08J 5/18*    (2006.01)
*B29C 55/02*    (2006.01)
(Continued)

(52) U.S. Cl.
CPC .................. *C08J 5/18* (2013.01); *B29C 55/02* (2013.01); *C08G 61/08* (2013.01); *H01G 4/18* (2013.01);
(Continued)

(58) Field of Classification Search
CPC ......... C08J 5/18; C08J 2345/00; B29C 55/02; C08G 61/08; C08G 2261/50; C08G 2261/60; C08G 2261/90; H01G 4/18
(Continued)

(56) References Cited

U.S. PATENT DOCUMENTS 5,194,534 A    3/1993    Bell
6,630,234 B1   10/2003   Tanisho et al.
(Continued)

FOREIGN PATENT DOCUMENTS

CN    107077969 A    8/2017
JP    S60262414 A    12/1985
(Continued)

OTHER PUBLICATIONS

Mar. 24, 2023, Communication pursuant to Article 94(3) EPC issued by the European Patent Office in the corresponding European Patent Application No. 19760437.4.
(Continued)

*Primary Examiner* — Arun Ramaswamy
(74) *Attorney, Agent, or Firm* — KENJA IP LAW PC

(57) ABSTRACT

Provided is a film for a capacitor that can improve dielectric strength retention at high temperatures and can also improve metal vapor deposition properties and formability. The film for a capacitor contains a hydrogenated dicyclopentadiene ring-opened polymer that is crystalline and has a heat shrinkage ratio of not less than 0.01% and not more than 1.0% when heated at 200° C. for 10 minutes, a plane orientation factor of 0.01 or more, a density of $1.03 \times 10^6$ $g/m^3$ or more, and a thickness of 15.0 μm or less.

2 Claims, 1 Drawing Sheet

(51) Int. Cl.
  *C08G 61/08* (2006.01)
  *H01G 4/18* (2006.01)
(52) U.S. Cl.
  CPC . *C08G 2261/3325* (2013.01); *C08G 2261/50* (2013.01); *C08G 2261/90* (2013.01); *C08J 2345/00* (2013.01)
(58) Field of Classification Search
  USPC .................................. 361/301.1, 301.5, 311
  See application file for complete search history.

(56) References Cited

U.S. PATENT DOCUMENTS

| | | | | |
|---|---|---|---|---|
| 2013/0021719 | A1* | 1/2013 | Busch | H01G 11/52 29/25.03 |
| 2016/0240008 | A1* | 8/2016 | Haddick | G02B 27/0093 |
| 2017/0301473 | A1 | 10/2017 | Miyazawa et al. | |
| 2017/0306113 | A1 | 10/2017 | Murakami et al. | |

FOREIGN PATENT DOCUMENTS

| | | | |
|---|---|---|---|
| JP | S63181411 | A | 7/1988 |
| JP | H02250360 | A | 10/1990 |
| JP | H0318113 | A | 1/1991 |
| JP | H03286514 | A | 12/1991 |
| JP | H05345817 | | 12/1993 |
| JP | H0680793 | A | 3/1994 |
| JP | 2006052333 | A | 2/2006 |
| JP | 2016120699 | A * | 7/2016 |
| KR | 1020060070617 | A | 6/2006 |
| WO | 2016052303 | A1 | 4/2016 |
| WO | 2016067893 | A1 | 5/2016 |

OTHER PUBLICATIONS

Sep. 1, 2020, International Preliminary Report on Patentability issued in the International Patent Application No. PCT/JP2019/005660.

Dec. 20, 2021, the Extended European Search Report issued by the European Patent Office in the corresponding European Patent Application No. 19760437.4.

Apr. 16, 2019, International Search Report issued in the International Patent Application No. PCT/JP2019/005660.

\* cited by examiner

FILM FOR CAPACITOR AND METHOD OF PRODUCING SAME

TECHNICAL FIELD

The present disclosure relates to a film for a capacitor and a method of producing the same.

BACKGROUND

A film capacitor, which is one type of capacitor, is a device that can store electrical charge and that has a structure in which dielectric films and metal layers are disposed alternately.

As a result of reduction in size and increased capacity of film capacitors in recent years, film capacitors tend to readily generate heat during operation. For this reason, there is demand for films used as dielectric films in film capacitors to have even better heat resistance.

There is also demand for thickness reduction of dielectric films in order to achieve more compact film capacitors, but reducing the thickness of a dielectric film tends to lead to poor voltage resistance characteristics (characteristics of maintaining an electrically insulating state at high voltages) and workability (attribute of enabling stable film capacitor production on an industrial production scale).

Therefore, studies have been carried out in relation to film capacitors that include dielectric films having excellent heat resistance, voltage resistance characteristics, and workability (for example, refer to Patent Literature (PTL) 1).

Studies have also been carried out in relation to barrier films including films having excellent dimensional stability in high-temperature environments (for example, refer to PTL 2).

CITATION LIST

Patent Literature

PTL 1: WO2016/052303A1
PTL 2: WO2016/067893A1

SUMMARY

Technical Problem

However, a film having molecular chains orientated in a plane of the film and having sufficiently high density has not yet been proposed, and there is room for improvement in terms of dielectric strength retention at high temperatures, metal vapor deposition properties, and formability.

Accordingly, an object of the present disclosure is to provide a film for a capacitor that can improve dielectric strength retention at high temperatures and can also improve metal vapor deposition properties and formability.

Solution to Problem

The inventors conducted diligent investigation with the aim of solving the problems set forth above. The inventors discovered that through a film for a capacitor containing a hydrogenated dicyclopentadiene ring-opened polymer that is crystalline and having a heat shrinkage ratio, plane orientation factor, density, and thickness that are within specific ranges, dielectric strength retention at high temperatures can be improved, and metal vapor deposition properties and formability can also be improved. In this manner, the inventors completed the present disclosure.

Specifically, the present disclosure aims to advantageously solve the problems set forth above, and a presently disclosed film for a capacitor comprises a hydrogenated dicyclopentadiene ring-opened polymer that is crystalline, and has a heat shrinkage ratio of not less than 0.01% and not more than 1.0% when heated at 200° C. for 10 minutes, a plane orientation factor of 0.01 or more, a density of $1.03 \times 10^6$ g/m$^3$ (1.03 g/cm$^3$) or more, and a thickness of 15.0 μm or less. As a result of the film for a capacitor containing a crystalline hydrogenated dicyclopentadiene ring-opened polymer and having a heat shrinkage ratio, plane orientation factor, density, and thickness that are within specific ranges in this manner, dielectric strength retention at high temperatures can be improved, and metal vapor deposition properties and formability can also be improved.

Note that the phrase "a hydrogenated dicyclopentadiene ring-opened polymer that is crystalline" as used in the present disclosure refers to "a hydrogenated dicyclopentadiene ring-opened polymer that has a melting point Tm (i.e., a hydrogenated dicyclopentadiene ring-opened polymer for which a melting point can be observed using a differential scanning calorimeter (DSC))".

Moreover, the "heat shrinkage ratio", "plane orientation factor", "density", and "thickness" can be measured by methods described in the EXAMPLES section of the present specification.

Moreover, the present disclosure aims to advantageously solve the problems set forth above, and a presently disclosed method of producing a film for a capacitor that is a method of producing the film for a capacitor set forth above comprises: a stretching treatment step of performing stretching treatment of an unstretched film under conditions of a stretching temperature of not lower than a glass-transition temperature Tg of the hydrogenated dicyclopentadiene ring-opened polymer and not higher than a melting point Tm of the hydrogenated dicyclopentadiene ring-opened polymer and a stretching ratio of not less than 1.5 times and not more than 10 times; a heat treatment step of performing heat treatment of a stretched film that has been stretched through the stretching treatment step under conditions of a heating temperature of not lower than 150° C. and not higher than 240° C. and a heating time of not less than 0.1 minutes and not more than 600 minutes; and a relaxation treatment step of performing relaxation treatment of the stretched film that has been heated through the heat treatment step under conditions of a relaxation temperature of not lower than 150° C. and not higher than 240° C. and a relaxation time of not less than 0.1 minutes and not more than 600 minutes with a reduction ratio of film fixed width of more than 0% and not more than 20%. Through the method of producing a film for a capacitor set forth above, it is possible to improve metal vapor deposition properties and formability of a film for a capacitor having high dielectric strength retention at high temperatures and to enable efficient production thereof.

Note that the "reduction ratio of film fixed width" is the proportion by which a holding interval of the film is narrowed in the relaxation treatment step.

Advantageous Effect

According to the present disclosure, it is possible to provide a film for a capacitor that can improve dielectric strength retention at high temperatures and can also improve metal vapor deposition properties and formability.

Moreover, according to the present disclosure, it is possible to provide a method of producing a film for a capacitor that can improve metal vapor deposition properties and formability of a film for a capacitor having high dielectric strength retention at high temperatures and that enables efficient production thereof.

DETAILED DESCRIPTION

Figure 1:
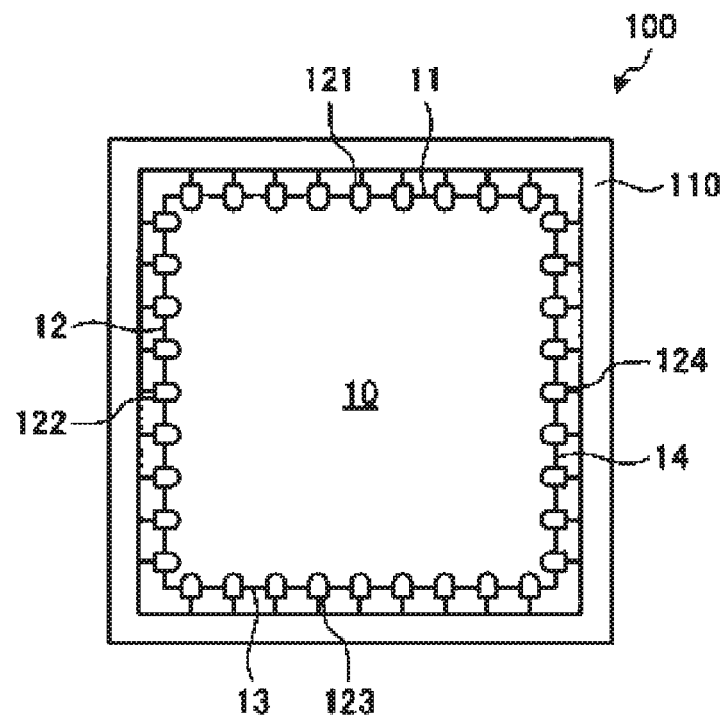
FIG. 1 is a plan view schematically illustrating an example of a holding device.

The following provides a detailed description of the present disclosure through embodiments and illustrations. However, the present disclosure is not limited to the following embodiments and illustrations and can be implemented with any changes that do not deviate from the claims of the present disclosure and equivalents thereof.

(Film for Capacitor)

The presently disclosed film for a capacitor contains at least a hydrogenated dicyclopentadiene ring-opened polymer that is crystalline and may include other components such as an anti-blocking agent as necessary.

<Crystalline Hydrogenated Dicyclopentadiene Ring-Opened Polymer>

The crystalline hydrogenated dicyclopentadiene ring-opened polymer is a hydrogenated dicyclopentadiene ring-opened polymer with which a film-like shaped product having a melting point is obtained through stretching treatment, etc.

The term "crystalline hydrogenated dicyclopentadiene ring-opened polymer" refers to a hydrogenated dicyclopentadiene ring-opened polymer that has a melting point Tm (i.e., for which a melting point can be observed using a differential scanning calorimeter (DSC)).

The melting point Tm of the hydrogenated dicyclopentadiene ring-opened polymer is not specifically limited but is preferably 200° C. or higher, more preferably 220° C. or higher, even more preferably 230° C. or higher, and particularly preferably 250° C. or higher, and is preferably 320° C. or lower, more preferably 300° C. or lower, even more preferably 290° C. or lower, and particularly preferably 270° C. or lower.

The dicyclopentadiene ring-opened polymer is a polymer in which the proportion of dicyclopentadiene-derived structural units relative to all structural units is normally 50 mass % or more, preferably 70 mass % or more, more preferably 90 mass % or more, even more preferably 95 mass % or more, and particularly preferably 100 mass %. No specific limitations are placed on structural units that can be included in the dicyclopentadiene ring-opened polymer other than being structural units derived from monomers that are copolymerizable with dicyclopentadienes, and examples thereof include structural units derived from monomers such as norbornenes, cycloolefins, and dienes.

The crystalline hydrogenated dicyclopentadiene ring-opened polymer may, for example, be a hydrogenated product of a ring-opened polymer of dicyclopentadiene having syndiotactic stereoregularity that is described in JP2006-52333A.

In the following description, a "ring-opened polymer of dicyclopentadiene having syndiotactic stereoregularity" is referred to as "polymer (α)" and a "hydrogenated product of polymer (α)" is referred to as "polymer (β)".

The glass-transition temperature Tg of the crystalline hydrogenated dicyclopentadiene ring-opened polymer is not specifically limited but, in general, is preferably 85° C. or higher, more preferably 87° C. or higher, even more preferably 90° C. or higher, and particularly preferably 95° C. or higher, and is preferably 170° C. or lower, more preferably 150° C. or lower, even more preferably 130° C. or lower, and particularly preferably 105° C. or lower.

{Polymer (α)}

The polymer (α) is obtained through ring-opening polymerization of a dicyclopentadiene. Endo and exo stereoisomers exist for the used dicyclopentadiene. Either of the endo isomer and the exo isomer can be used as the dicyclopentadiene. One of the endo isomer or the exo isomer may be used individually as the dicyclopentadiene, or an isomer mixture in which the endo isomer and the exo isomer are mixed in any proportions may be used as the dicyclopentadiene. In particular, it is preferable that the proportion of one stereoisomer among the endo isomer and the exo isomer is high and that either the endo isomer or the exo isomer is a main component of the dicyclopentadiene from a viewpoint of increasing the crystallinity of the polymer (β) and obtaining even better heat resistance. For example, the proportion constituted by one out of the endo isomer and the exo isomer is preferably more than 50 mass %, more preferably 80 mass % or more, even more preferably 90 mass % or more, further preferably 95 mass % or more, and particularly preferably 97 mass % or more. The proportion constituted by the endo isomer is preferably high from a viewpoint of ease of synthesis.

The polymer (α) may include repeating units other than dicyclopentadiene-derived repeating units so long as it yields a polymer (β) that is crystalline. A polymer (α) such as described can be produced through ring-opening copolymerization of dicyclopentadiene and a monomer other than dicyclopentadiene.

Examples of monomers other than dicyclopentadiene that can be used include polycyclic norbornene-based compounds other than dicyclopentadiene that include 3 or more rings, bicyclic norbornene-based compounds that do not include a ring structure fused to a norbornene skeleton, monocyclic olefins, cyclic dienes, and derivatives of any of these examples.

In a case in which any of these monomers is used, the amount thereof relative to all monomers is normally less than 50 mass %, preferably more than 0 mass % and not more than 20 mass %, and more preferably more than 0 mass % and not more than 10 mass %.

—Catalyst—

The catalyst used in production of the polymer (α) is normally a ring-opening polymerization catalyst but no specific limitations are made so long as it is a catalyst with which ring-opening polymerization of dicyclopentadiene can be performed to produce the polymer (α). The ring-opening polymerization catalyst may be one type of catalyst used individually or two or more types of catalysts used in combination in a freely selected ratio.

Suitable examples of such ring-opening polymerization catalysts include those with which a ring-opened polymer having syndiotactic stereoregularity can be produced through ring-opening polymerization of dicyclopentadiene, such as a ring-opening polymerization catalyst that includes a metal compound represented by the following formula (1) (hereinafter, also referred to as "metal compound (1)") as a catalytically active component, for example.

$$M(NR^1)X_{4-a}(OR^2)_a \cdot L_b \quad (1)$$

(In formula (1)):

M indicates a metal atom selected from the group consisting of transition metal atoms in group 6 of the periodic table;

$R^1$ indicates a phenyl group that optionally has a substituent at one or more of the 3, 4, and 5 positions or a group represented by —$CH_2R^3$ ($R^3$ indicates a group selected from the group consisting of a hydrogen atom, an optionally substituted alkyl group, and an optionally substituted aryl group);

$R^2$ indicates a group selected from the group consisting of an optionally substituted alkyl group and an optionally substituted aryl group;

X indicates a group selected from the group consisting of a halogen atom, an optionally substituted alkyl group, an optionally substituted aryl group, and an alkylsilyl group;

L indicates an electron donating neutral ligand;

a indicates a number of 0 or 1; and b indicates an integer of 0 to 2, where in a case in which more than one X or more than one L is present, each X or each L may be the same or different.)

The metal atom (M) of the metal compound (1) is selected from the group consisting of transition metal atoms of group 6 of the periodic table (chromium, molybdenum, and tungsten). Of these metal atoms, chromium, molybdenum, and tungsten are preferable, molybdenum or tungsten is more preferable, and tungsten is particularly preferable.

The metal compound (1) is a compound that includes a metal imide bond.

10 is a substituent on a nitrogen atom of the metal imide bond.

In formula (1), 10 indicates a phenyl group that optionally has a substituent at one or more of the 3, 4, and 5 positions or a group represented by —$CH_2R^3$.

The number of carbon atoms in the phenyl group of $R^1$ that optionally has a substituent at one or more of the 3, 4, and 5 positions is not specifically limited but is preferably 6 or more, and is preferably 20 or fewer, and more preferably 15 or fewer. The substituent may be an alkyl group such as a methyl group or an ethyl group; a halogen atom such as a fluorine atom, a chlorine atom, or a bromine atom; an alkoxy group such as a methoxy group, an ethoxy group, or an isopropoxy group; or the like, for example. One of these substituents may be included individually, or two or more of these substituents may be included in a freely selected ratio. Moreover, in $R^1$, substituents present at two or more of the 3, 4, and 5 positions may be bonded to one another to form a ring structure.

The phenyl group optionally having a substituent at one or more of the 3, 4, and 5 positions may be an unsubstituted phenyl group; a monosubstituted phenyl group such as a 4-methylphenyl group, a 4-chlorophenyl group, a 3-methoxyphenyl group, a 4-cyclohexylphenyl group, or a 4-methoxyphenyl group; a disubstituted phenyl group such as a 3,5-dimethylphenyl group, a 3,5-dichlorophenyl group, a 3,4-dimethylphenyl group, or a 3,5-dimethoxyphenyl group; a trisubstituted phenyl group such as a 3,4,5-trimethylphenyl group or a 3,4,5-trichlorophenyl group; or an optionally substituted 2-naphthyl group such as a 2-naphthyl group, a 3-methyl-2-naphthyl group, or a 4-methyl-2-naphthyl group, for example.

In the group represented by —$CH_2R^3$ of $R^1$, $R^3$ indicates a group selected from the group consisting of a hydrogen atom, an optionally substituted alkyl group, and an optionally substituted aryl group.

The number of carbons atoms in the optionally substituted alkyl group of $R^3$ is not specifically limited but is preferably 1 or more, and is preferably 20 or fewer, more preferably 10 or fewer, and particularly preferably 4 or fewer. The alkyl group may be linear or branched. Moreover, the substituent may be an optionally substituted phenyl group such as a phenyl group or a 4-methylphenyl group; an alkoxyl group such as a methoxy group or an ethoxy group; or the like, for example. One of these substituents may be used individually, or two or more of these substituents may be used in combination in a freely selected ratio.

The optionally substituted alkyl group of $R^3$ may be a methyl group, an ethyl group, a propyl group, an isopropyl group, a butyl group, an isobutyl group, a t-butyl group, a pentyl group, a neopentyl group, a pentyl group, a hexyl group, an octyl group, a benzyl group, a neophyl group, or the like, for example.

The number of carbon atoms in the optionally substituted aryl group of $R^3$ is not specifically limited but is preferably 6 or more, and is preferably 20 or fewer, and more preferably 15 or fewer. The substituent may be an alkyl group such as a methyl group or an ethyl group; a halogen atom such as a fluorine atom, a chlorine atom, or a bromine atom; an alkoxy group such as a methoxy group, an ethoxy group, or an isopropoxy group; or the like, for example. One of these substituents may be used individually, or two or more of these substituents may be used in combination in a freely selected ratio.

The optionally substituted aryl group of $R^3$ may be a phenyl group, a 1-naphthyl group, a 2-naphthyl group, a 4-methylphenyl group, a 2,6-dimethylphenyl group, or the like, for example. A substituent of the aryl group may, without any specific limitations, be an optionally substituted phenyl group such as a phenyl group or a 4-methylphenyl group; an alkoxy group such as a methoxy group or an ethoxy group; or the like, for example.

Of these examples, an alkyl group including 1 to 20 carbon atoms is preferable as the group represented by $R^3$.

$R^2$ in the metal compound (1) is a group selected from the group consisting of an optionally substituted alkyl group and an optionally substituted aryl group. The optionally substituted alkyl group and the optionally substituted aryl group of $R^2$ may be any group selected from the scope indicated for the optionally substituted alkyl group and the optionally substituted aryl group of $R^3$.

The metal compound (1) includes 3 or 4 groups selected from a halogen atom, an alkyl group, an aryl group, and an alkylsilyl group. In other words, X in formula (1) represents a group selected from the group consisting of a halogen atom, an optionally substituted alkyl group, an optionally substituted aryl group, and an alkylsilyl group. Note that in a case in which two or more groups represented by X are present in the metal compound (1), these groups may be bonded to one another.

The halogen atom of X may be a chlorine atom, a bromine atom, or an iodine atom.

The optionally substituted alkyl group and the optionally substituted aryl group of X may be any group selected from the scope indicated for the optionally substituted alkyl group and the optionally substituted aryl group of $R^3$.

The alkylsilyl group of X may be a trimethylsilyl group, a triethylsilyl group, a t-butyldimethylsilyl group, or the like, for example.

In a case in which the metal compound (1) includes two or more X groups in one molecule, these X groups may be the same or different.

Moreover, two or more X groups may be bonded to one another to form a ring structure.

The metal compound (1) may be a compound that includes one metal alkoxide bond or one metal aryloxide bond. A substituent ($R^2$ in formula (1)) on an oxygen atom of the metal alkoxide bond or metal aryloxide bond indicates a group selected from the group consisting of an optionally substituted alkyl group and an optionally substituted aryl group. The optionally substituted alkyl group and the optionally substituted aryl group of $R^2$ may be any group selected from the scope indicated for the optionally substituted alkyl group and the optionally substituted aryl group of $R^3$.

The metal compound (1) may be a compound that includes one or two electron donating neutral ligands.

The electron donating neutral ligand (L in formula (1)) may be an electron donating compound that includes an atom from group 15 or 16 of the periodic table, for example.

Specific examples include phosphines such as trimethylphosphine, triisopropylphosphine, tricyclohexylphosphine, and triphenylphosphine; ethers such as diethyl ether, dibutyl ether, 1,2-dimethoxyethane, and tetrahydrofuran; and amines such as trimethylamine, triethylamine, pyridine, and lutidine. Of these examples, ethers are preferable. In a case in which the metal compound indicated by formula (1) includes two L ligands in one molecule, these L ligands may be the same or different.

The metal compound (1) is preferably a tungsten compound that includes a phenyl imide group. In other words, a compound for which M is a tungsten atom and $R^1$ is a phenyl group in formula (1) is preferable. Of such compounds, a tetrachlorotungsten phenylimide (tetrahydrofuran) complex is more preferable.

No specific limitations are placed on the method by which the metal compound (1) is produced. For example, the metal compound indicated by formula (1) can be produced as described in JP-H5-345817A by mixing an oxyhalide of a group 6 transition metal; a phenyl isocyanate optionally having a substituent at one or more of the 3, 4, and 5 positions or a monosubstituted methyl isocyanate; an electron donating neutral ligand (L); and, as necessary, an alcohol, metal alkoxide, or metal aryloxide. In this production method, the metal compound (1) is normally obtained in a state in which it is contained in a reaction liquid. The produced metal compound (1) may be isolated and purified from the reaction liquid by purification treatment such as crystallization and then the obtained metal compound (1) may be used in the ring-opening polymerization reaction, or the obtained reaction liquid (mixed liquid) may be used in that form without purification as a catalyst liquid in the ring-opening polymerization reaction.

The amount of the metal compound (1) that is used as the ring-opening polymerization catalyst is an amount such that the molar ratio of "metal compound (1):monomer" is preferably 1:100 to 1:2,000,000, more preferably 1:500 to 1:1,000,000, and particularly preferably 1:1,000 to 1:500,000. Catalyst removal is difficult when too much of the catalyst is used, whereas sufficient polymerization activity may not be obtained when too little of the catalyst is used.

In ring-opening polymerization performed using the metal compound (1), the metal compound (1) may be used individually or the metal compound (1) may be used in combination with another component. For example, polymerization activity can be improved by using the metal compound (1) and an organometallic reducing agent together.

—Organometallic Reducing Agent—

The organometallic reducing agent may, for example, be an organometallic compound of any of groups 1, 2, 12, 13, and 14 of the periodic table that includes a hydrocarbon group having a carbon number of 1 to 20. In particular, an organolithium, organomagnesium, organozinc, organoaluminum, or organotin is preferable, and an organoaluminum or organotin is particularly preferable. Moreover, one organometallic reducing agent may be used individually, or two or more organometallic reducing agents may be used in combination in a freely selected ratio.

Examples of organolithium include methyllithium, n-butyllithium, and phenyllithium. Examples of organomagnesium include butylethylmagnesium, butyloctylmagnesium, dihexylmagnesium, ethylmagnesium chloride, n-butylmagnesium chloride, and allylmagnesium bromide. Examples of organozinc include dimethylzinc, diethylzinc, and diphenylzinc. Examples of organoaluminum include trimethylaluminum, tri ethyl aluminum, triisobutylaluminum, di ethyl aluminum chloride, ethyl aluminum sesquichloride, ethyl aluminum dichloride, diethylaluminum ethoxide, diisobutylaluminum isobutoxide, ethylaluminum diethoxide, and isobutylaluminum diisobutoxide. Examples of organotin include tetramethyltin, tetra(n-butyl)tin, and tetraphenyltin.

The used amount of the organometallic reducing agent per 1 mol of the metal compound (1) is preferably 0.1 mol or more, more preferably 0.2 mol or more, and particularly preferably 0.5 mol or more, and is preferably 100 mol or less, more preferably 50 mol or less, and particularly preferably 20 mol or less. When the amount of the organometallic reducing agent is not less than the lower limit of any of the ranges set forth above, polymerization activity can be sufficiently increased. Moreover, when the amount is not more than any of the upper limits, the occurrence of side reactions can be inhibited.

—Ring-Opening Polymerization Reaction—

The ring-opening polymerization reaction is normally carried out in an organic solvent.

No specific limitations are placed on the organic solvent that is used other than being a solvent in which the polymer (α) or polymer (β) that is a target can be dissolved or dispersed under specific conditions and that does not interfere with the polymerization reaction or a hydrogenation reaction.

Specific examples of organic solvents that can be used include aliphatic hydrocarbons such as pentane, hexane, and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons such as benzene, toluene, and xylene; halogenated aliphatic hydrocarbons such as dichloromethane, chloroform, and 1,2-dichloroethane; halogenated aromatic hydrocarbons such as chlorobenzene and dichlorobenzene; nitrogen-containing hydrocarbons such as nitromethane, nitrobenzene, and acetonitrile; ethers such as diethyl ether and tetrahydrofuran; and mixed solvents that are a combination of any of the preceding examples. Of these organic solvents, aromatic hydrocarbons, aliphatic hydrocarbons, alicyclic hydrocarbons, and ethers are preferable. One organic solvent may be used individually, or two or more organic solvents may be used in combination in a freely selected ratio.

The ring-opening polymerization reaction can be initiated by mixing the monomer(s), the metal compound (1), and, as necessary, the organometallic reducing agent, for example.

No specific limitations are placed on the order in which these components are added. For example, a mixture of the metal compound (1) and the organometallic reducing agent may be added to the monomer(s) and mixed therewith, a mixture of the monomer(s) and the metal compound (1) may be added to the organometallic reducing agent and mixed therewith, or the metal compound (1) may be added to a mixture of the monomer(s) and the organometallic reducing agent and mixed therewith.

Mixing of each of the components may be performed by adding all of the component at once or by dividing the component between a plurality of additions. Moreover, mixing may be performed continuously over a relatively long period of time (for example, 1 minute or longer).

The monomer concentration in the reaction liquid at the start of the ring-opening polymerization reaction is not specifically limited but is preferably 1 mass % or more, more preferably 2 mass % or more, and particularly preferably 3 mass % or more, and is preferably 50 mass % or less, more preferably 45 mass % or less, and particularly preferably 40 mass % or less. When the monomer concentration is not less than the lower limit of any of the ranges set forth above, productivity can be increased. Moreover, when the monomer concentration is not more than the upper limit of any of the ranges set forth above, the subsequent hydrogenation reaction can be easily carried out because the viscosity of the reaction liquid after the ring-opening polymerization reaction can be reduced.

—Activity Modifier—

An activity modifier may be added to the polymerization reaction system. The activity modifier is used in order to stabilize the ring-opening polymerization catalyst and to adjust the reaction rate of the ring-opening polymerization reaction and the molecular weight distribution of the polymer.

The activity modifier may be an organic compound that includes a functional group. Such an activity modifier is preferably an oxygen-containing organic compound, a nitrogen-containing organic compound, or a phosphorus-containing organic compound, for example.

Examples of oxygen-containing organic compounds that can be used include ethers such as diethyl ether, diisopropyl ether, dibutyl ether, anisole, furan, and tetrahydrofuran; ketones such as acetone, benzophenone, and cyclohexanone; and esters such as ethyl acetate.

Examples of nitrogen-containing organic compounds that can be used include nitriles such as acetonitrile and benzonitrile; amines such as triethylamine, triisopropylamine, quinuclidine, and N,N-diethylaniline; and pyridines such as pyridine, 2,4-lutidine, 2,6-lutidine, and 2-t-butylpyridine.

Examples of phosphorus-containing organic compounds that can be used include phosphines such as triphenylphosphine and tricyclohexylphosphine; phosphates such as triphenyl phosphate and trimethyl phosphate; and phosphine oxides such as triphenylphosphine oxide.

One of these activity modifiers may be used individually, or two or more of these activity modifiers may be used in combination in a freely selected ratio.

In a case in which an activity modifier is used in the polymerization reaction system, the amount of the activity modifier is not specifically limited but is preferably within a range of 0.01 mol % to 100 mol % per 100 mol % of the metal compound (1) used as the ring-opening polymerization catalyst.

—Molecular Weight Modifier—

A molecular weight modifier may be added to the polymerization reaction system in order to adjust the molecular weight of the polymer ($\alpha$).

Examples of molecular weight modifiers that can be used include $\alpha$-olefins such as 1-butene, 1-pentene, 1-hexene, and 1-octene; aromatic vinyl compounds such as styrene and vinyltoluene; oxygen-containing vinyl compounds such as ethyl vinyl ether, isobutyl vinyl ether, allyl glycidyl ether, allyl acetate, allyl alcohol, and glycidyl methacrylate; halogen-containing vinyl compounds such as allyl chloride; nitrogen-containing vinyl compounds such as acrylamide; non-conjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; and conjugated dienes such as 1,3-butadiene, 2-methyl-1,3-butadiene, 2,3-dimethyl-1,3-butadiene, 1,3-pentadiene, and 1,3-hexadiene. One molecular weight modifier may be used individually, or two or more molecular weight modifiers may be used in combination in a freely selected ratio.

The amount of the molecular weight modifier in the polymerization reaction system can be set as appropriate depending on the target molecular weight. The specific amount of the molecular weight modifier is preferably within a range of 0.1 mol % to 50 mol % per 100 mol % of the used monomer(s).

The polymerization temperature is not specifically limited but is preferably −78° C. or higher, and more preferably −30° C. or higher, and is preferably +200° C. or lower, and more preferably +180° C. or lower. The polymerization time is not specifically limited and depends on the scale of reaction, but is preferably within a range of 1 minute to 1,000 hours.

By carrying out a ring-opening polymerization reaction of monomer including dicyclopentadiene under the conditions set forth above using a ring-opening polymerization catalyst including a metal compound (1) such as set forth above, it is possible to efficiently produce the polymer ($\alpha$).

The crystallinity of the polymer ($\alpha$) can normally be increased by increasing the degree of syndiotactic stereoregularity (proportion of racemo diads (meso/racemo ratio)) of the polymer ($\alpha$).

The proportion of racemo diads in the polymer ($\alpha$) (degree of syndiotactic stereoregularity) is not specifically limited but is preferably 51% or more, more preferably 60% or more, particularly preferably 65% or more, and most preferably 70% or more from a viewpoint of increasing the degree of stereoregularity. The proportion of racemo diads in the polymer ($\alpha$) can be adjusted through selection of the type of ring-opening polymerization catalyst, for example.

The weight-average molecular weight (Mw) of the dicyclopentadiene ring-opened polymer is not specifically limited but is preferably 1,000 to 1,000,000, and more preferably 2,000 to 500,000. When a ring-opened polymer having a weight-average molecular weight such as described above is subjected to a hydrogenation reaction, a polymer ($\beta$) having excellent shaping processability can be obtained. The weight-average molecular weight of the ring-opened polymer can be adjusted by adjusting the additive amount of a molecular weight modifier used in polymerization, for example.

The molecular weight distribution (Mw/Mn) of the dicyclopentadiene ring-opened polymer is not specifically limited but is preferably 1.0 to 4.0, and more preferably 1.5 to 3.5. When a ring-opened polymer having a molecular weight distribution such as described above is subjected to a hydrogenation reaction, a polymer ($\beta$) having excellent shaping processability can be obtained. The molecular weight distribution of the ring-opened polymer can be adjusted through the addition method and the concentration of the monomer(s) in the polymerization reaction.

The weight-average molecular weight (Mw) and the molecular weight distribution (Mw/Mn) of the dicyclopentadiene ring-opened polymer are polystyrene-equivalent values that are measured by gel permeation chromatography (GPC) using tetrahydrofuran as a developing solvent.

{Polymer (β)}

The polymer (β) can be produced by carrying out a hydrogenation reaction (hydrogenation reaction of carbon-carbon unsaturated bonds) with respect to the polymer (α).

The hydrogenation reaction of the polymer (α) can be carried out in accordance with a standard method by supplying hydrogen into a reaction system containing the polymer (α) in the presence of a hydrogenation catalyst, for example. By setting suitable reaction conditions in the hydrogenation reaction, the tacticity of the hydrogenated product does not normally change through the hydrogenation reaction.

—Hydrogenation Catalyst—

No specific limitations are placed on the hydrogenation catalyst, and any homogeneous catalyst or heterogeneous catalyst that is typically used in hydrogenation reactions of olefin compounds can be used as appropriate.

Examples of homogeneous catalysts that can be used include catalysts that are combinations of transition metal compounds and alkali metal compounds such as cobalt acetate/tri ethyl aluminum, nickel acetylacetonate/tri-isobutylaluminum, titanocene dichloride/n-butyllithium, zirconocene dichloride/sec-butyllithium, and tetrabutoxytitanate/dimethylmagnesium; and precious metal complex catalysts such as bis(triphenylphosphine)palladium dichloride, chlorohydridocarbonyltris(triphenylphosphine)ruthenium, chlorohydridocarbonylbis(tricyclohexylphosphine)ruthenium, bis(tricyclohexylphosphine)benzylidene ruthenium(IV) dichloride, and tris(triphenylphosphine)rhodium chloride. Of these homogeneous catalysts, precious metal complex catalysts are preferable due to their high decomposition temperature.

Examples of heterogeneous catalysts that can be used include nickel, palladium, platinum, rhodium, ruthenium, and solid catalysts having any of these metals mounted on a support (for example, carbon, silica, diatomaceous earth, alumina, or titanium oxide) such as nickel/silica, nickel/diatomaceous earth, nickel/alumina, palladium/carbon, palladium/silica, palladium/diatomaceous earth, and palladium/alumina.

One hydrogenation catalyst may be used individually, or two or more hydrogenation catalysts may be used in combination in a freely selected ratio.

—Hydrogenation Reaction—

The hydrogenation reaction is normally carried out in an inert organic solvent. Examples of inert organic solvents that can be used include aromatic hydrocarbons such as benzene and toluene; aliphatic hydrocarbons such as pentane and hexane; alicyclic hydrocarbons such as cyclohexane and decahydronaphthalene; and ethers such as tetrahydrofuran and ethylene glycol dimethyl ether. One inert organic solvent may be used individually, or two or more inert organic solvents may be used in combination in a freely selected ratio. The inert organic solvent may be the same as or different from the organic solvent used in the ring-opening polymerization reaction. The inert organic solvent may be the same as or different from the organic solvent used in the ring-opening polymerization reaction. The hydrogenation reaction may be carried out by mixing the hydrogenation catalyst with the reaction liquid of the ring-opening polymerization reaction.

Preferable reaction conditions for the hydrogenation reaction differ depending on the hydrogenation catalyst that is used.

The reaction temperature of the hydrogenation reaction is not specifically limited but is preferably −20° C. or higher, more preferably −10° C. or higher, and particularly preferably 0° C. or higher, and is preferably +250° C. or lower, more preferably +220° C. or lower, and particularly preferably +200° C. or lower. Setting the reaction temperature as not lower than the lower limit of any of the ranges set forth above can increase the reaction rate, whereas setting the reaction temperature as not higher than the upper limit of any of the ranges set forth above can inhibit the occurrence of side reactions.

The hydrogen pressure in the hydrogenation reaction is not specifically limited but is preferably 0.01 MPa or higher, more preferably 0.05 MPa or higher, and particularly preferably 0.1 MPa or higher, and is preferably 20 MPa or lower, more preferably 15 MPa or lower, and particularly preferably 10 MPa or lower. Setting the hydrogen pressure as not lower than the lower limit of any of the ranges set forth above can increase the reaction rate, and setting the hydrogen pressure as not higher than the upper limit of any of the ranges set forth above makes it unnecessary to use a special apparatus such as a reactor having high pressure resistance and can keep down equipment cost.

The reaction time of the hydrogenation reaction may be set as any time without any specific limitations so long as the desired percentage hydrogenation is achieved, but is preferably 0.1 hours to 10 hours.

The polymer (β) that is a hydrogenated product of the polymer (α) is normally collected by a standard method after the hydrogenation reaction.

The percentage hydrogenation (proportion of double bonds that are hydrogenated) in the hydrogenation reaction is not specifically limited but is preferably 70% or more, more preferably 80% or more, even more preferably 90% or more, particularly preferably 98% or more, and most preferably 99% or more. Heat resistance of the polymer (β) is further improved when the percentage hydrogenation is higher.

The percentage hydrogenation of a polymer can be calculated through $^1$H-NMR measurement at 145° C. with orthodichlorobenzene-$d_4$ as a solvent.

The syndiotactic stereoregularity of the polymer (α) that is subjected to the hydrogenation reaction is normally maintained in the polymer (β). Consequently, the polymer (β) has syndiotactic stereoregularity. The proportion of racemo diads in the polymer (β) (i.e., the proportion of racemo diads for repeating units obtained by hydrogenating a ring-opened polymer obtained through ring-opening polymerization of dicyclopentadiene) is not specifically limited so long as the polymer (β) is crystalline, but is preferably 51% or more, more preferably 60% or more, particularly preferably 65% or more, and most preferably 70% or more.

The hydrogenated product of the dicyclopentadiene ring-opened polymer has a higher melting point when the proportion of racemo diads is higher (i.e., when syndiotactic stereoregularity is higher).

Note that the proportion of racemo diads in the polymer (α) and the polymer (β) described above can be quantified based on spectral data obtained through measurement of a $^{13}$C-NMR spectrum. For example, the proportion of racemo diads can be determined by performing $^{13}$C-NMR measurement by an inverse-gated decoupling method at 200° C. using a mixed solvent of 1,2,4-trichlorobenzene-$d_3$ and orthodichlorobenzene-$d_4$, and then determining the proportion of racemo diads from an intensity ratio of a signal at 43.35 ppm attributed to meso diads and a signal at 43.43 ppm attributed to racemo diads, with a peak at 127.5 ppm for orthodichlorobenzene-$d_4$ taken as a standard shift.

The polymer (β) is crystalline (i.e., a film-like shaped product having a melting point is obtained therewith). The temperature range for the melting point is not specifically limited but is normally 260° C. to 275° C.

A polymer (β) having a melting point such as described above has a better balance of formability and heat resistance. The melting point of the polymer (β) can be adjusted through adjustment of the degree of syndiotactic stereoregularity (proportion of racemo diads), through selection of the type of used monomer(s), and so forth.

When using the polymer (β), the polymer (β) may be used on its own or with other components added thereto.

<Anti-Blocking Agent>

Examples of anti-blocking agents that can be added as other components include inorganic fine particles formed of inorganic substances such as silica; organic fine particles formed of organic substances such as acrylic cross-linked resins and melamine thermosetting resins; and organic-inorganic particles such as fatty acid metal salts (calcium stearate, etc.) and silicon-acrylic composite materials. One of these anti-blocking agents may be used individually, or two or more of these anti-blocking agents may be used in combination in a freely selected ratio.

Of these anti-blocking agents, inorganic fine particles and fatty acid metal salts are preferable in terms of lubricity, with fatty acid metal salts being particularly preferable.

The number-average particle diameter of fine particles of the anti-blocking agent is not specifically limited but is preferably 0.01 μm or more in terms of lubricity, and is preferably 1.5 μm or less in terms of transparency.

<Other Components>

Examples of other components besides anti-blocking agents that can be used include antioxidants such as phenolic antioxidants, phosphoric antioxidants, and sulfuric antioxidants; light stabilizers such as hindered amine light stabilizers; waxes such as petroleum waxes, Fischer-Tropsch waxes, and polyalkylene waxes; nucleating agents such as sorbitol compounds, organophosphate metal salts, organo-carboxylate metal salts, kaolin, and talc; fluorescent whitening agents such as diaminostilbene derivatives, coumarin derivatives, azole derivatives (for example, benzoxazole derivatives, benzotriazole derivatives, benzimidazole derivatives, and benzothiazole derivatives), carbazole derivatives, pyridine derivatives, naphthalic acid derivatives, and imidazolone derivatives; ultraviolet absorbers such as benzophenone ultraviolet absorbers, salicylic acid ultraviolet absorbers, and benzotriazole ultraviolet absorbers; inorganic fillers such as talc, silica, calcium carbonate, and glass fiber; flame retardants; flame retardant synergists; antistatic agents; plasticizers; near-infrared absorbers; lubricants; and polymer materials other than the polymer (β) such as soft polymers and fillers other than anti-blocking agents. One of such other components may be used individually, or two or more of such other components may be used in combination in a freely selected ratio.

In a case in which other components are used, the amounts of these other components can be set as appropriate depending on the objective without any specific limitations other than that they do not impair the effects disclosed herein. The amount of other components is not specifically limited but is preferably 5 parts by mass or less, more preferably 3 parts by mass or less, and particularly preferably 2 parts by mass or less per 100 parts by mass of the crystalline hydrogenated dicyclopentadiene ring-opened polymer.

The presently disclosed film for a capacitor is obtained by, for example, performing the steps of the subsequently described method of producing a film for a capacitor (stretching treatment step, heat treatment step, and relaxation treatment step) with respect to a subsequently described unstretched film that is obtained through shaping of a composition containing the crystalline hydrogenated dicyclopentadiene ring-opened polymer described above by a commonly known shaping method.

The following describes the film for a capacitor in detail.

<Heat Shrinkage Ratio of Film for Capacitor>

The heat shrinkage ratio of the film for a capacitor when heated at 200° C. for 10 minutes is not specifically limited so long as it is not less than 0.01% and not more than 1.0%, but is preferably 0.02% or more, more preferably 0.03% or more, and particularly preferably 0.04% or more in terms of workability, and is preferably 0.9% or less, more preferably 0.8% or less, and particularly preferably 0.7% or less in terms of heat resistance.

The heat shrinkage ratio can be reduced by, for example, performing stretching treatment with a stretching temperature that is not excessively high and performing heat treatment at an appropriate temperature over a certain period of time.

Note that the "heat shrinkage ratio" can be measured by a method described in the EXAMPLES section of the present specification.

<Plane Orientation Factor of Film for Capacitor>

The plane orientation factor of the film for a capacitor is not specifically limited so long as it is 0.01 or more, but is preferably 0.0102 or more, more preferably 0.0104 or more, and particularly preferably 0.0106 or more in terms of surface uniformity of the film, and is preferably 0.03 or less, more preferably 0.025 or less, and particularly preferably 0.02 or less in terms of ease of acquisition.

When the plane orientation factor of the film for a capacitor is 0.01 or more, a higher proportion of molecular chains are aligned in a plane of the film for a capacitor. Thus, when voltage is applied to the film for a capacitor, electrons align in a perpendicular direction relative to the direction of voltage application, electron flow is inhibited, and electrical insulation of the film for a capacitor is improved. Moreover, when the plane orientation factor of the film for a capacitor is 0.01 or more, vapor deposition properties of the film for a capacitor are improved because the uniformity of the surface (planar shape) of the film for a capacitor is improved.

Note that the "plane orientation factor" can be measured by a method described in the EXAMPLES section of the present specification.

<Density of Film for Capacitor>

The density of the film for a capacitor is not specifically limited so long as it is $1.03 \times 10^6$ g/m$^3$ or more, but is preferably $1.0305 \times 10^6$ g/m$^3$ or more, more preferably $1.0310 \times 10^6$ g/m$^3$ or more, and particularly preferably $1.0315 \times 10^6$ g/m$^3$ or more in terms of heat resistance, and is preferably $1.50 \times 10^6$ g/m$^3$ or less, more preferably $1.48 \times 10^6$ g/m$^3$ or less, and particularly preferably $1.45 \times 10^6$ g/m$^3$ or less in terms of ease of acquisition.

When the density of the film for a capacitor is $1.03 \times 10^6$ g/m$^3$ or more, amorphous sections of the film for a capacitor are reduced, and thus crystallinity of the film for a capacitor is increased, and formability, heat resistance, and electrical insulation of the film for a capacitor are improved.

The density of the film for a capacitor tends to be higher when the proportion of racemo diads in the hydrogenated product of the dicyclopentadiene ring-opened polymer (meso/racemo ratio) is higher.

Note that the "density" can be measured by a method described in the EXAMPLES section of the present specification.

<Thickness of Film for Capacitor>

The thickness of the film for a capacitor is not specifically limited so long as it is 15.0 μm or less, but is preferably 10.0 μm or less, more preferably 8.0 μm or less, particularly preferably 5.0 μm or less, and most preferably 4.0 μm or less in terms of improving flexibility, inhibiting wrinkling and misalignment during shaping, and reducing product size.

When the thickness of the film for a capacitor is 10.0 μm or less, flexibility improves, wrinkling and misalignment during shaping can be inhibited, and the size of a product in which the film for a capacitor is used can be reduced.

Note that the "thickness" can be measured by a method described in the EXAMPLES section of the present specification.

<Coefficient of Static Friction of Film for Capacitor>

The coefficient of static friction of the film for a capacitor is not specifically limited but is preferably 0.01 or more, more preferably 0.10 or more, and particularly preferably 0.50 or more in terms of workability in production of a capacitor using the film for a capacitor, and is preferably 1.00 or less, and more preferably 0.90 or less in terms of workability in production of a capacitor using the film for a capacitor.

The coefficient of static friction of the film for a capacitor can be reduced by, for example, increasing the stretching ratio or the stretching rate in stretching treatment or performing heat treatment at an appropriate temperature over a certain period of time. Moreover, a film for a capacitor having a smaller coefficient of static friction can be produced by using a polymer (β) that has a high proportion of racemo diads or percentage hydrogenation.

Note that the "coefficient of static friction" can be measured by a method described in the EXAMPLES section of the present specification.

<Softening Point of Film for Capacitor>

The softening point of the film for a capacitor is not specifically limited but is preferably 250° C. or higher, more preferably 252° C. or higher, and particularly preferably 255° C. or higher in terms of workability in production of a capacitor using the film for a capacitor, and is preferably 320° C. or lower, more preferably 300° C. or lower, and particularly preferably 280° C. or lower in terms of ease of acquisition of the film for a capacitor.

The softening point of the film for a capacitor can be raised by, for example, increasing the stretching ratio or the stretching rate in stretching treatment. Moreover, a film for a capacitor having a higher softening point can be obtained by using a polymer (β) that has a high proportion of racemo diads or percentage hydrogenation.

Note that the "softening point" can be measured by a method described in the EXAMPLES section of the present specification.

<Tan δ of Film for Capacitor>

Tan δ of the film for a capacitor is not specifically limited but is preferably 0.0001 or more, more preferably 0.0002 or more, and particularly preferably 0.0003 or more in terms of ease of acquisition of the film for a capacitor, and is preferably 0.0010 or less, more preferably 0.0008 or less, and particularly preferably 0.0006 or less in terms of voltage resistance characteristics of the film for a capacitor.

Tan δ of the film for a capacitor can be reduced by, for example, avoiding performing heating for a long time in heat treatment. Moreover, a film for a capacitor having a smaller tan δ can be produced by reducing the amount of metal contained as an impurity in the polymer (β).

Note that "tan δ" can be measured by a method described in the EXAMPLES section of the present specification.

<Capacitor>

The presently disclosed film for a capacitor is optionally subjected to surface treatment such as corona treatment or plasma treatment, is subsequently cut to a specific size, and is used as a material of a capacitor.

The capacitor in which the film for a capacitor is used may be a stacked film capacitor in which films for a capacitor and metal layers are stacked alternately (JP-S63-181411A, JP-H3-18113A, etc.); a wound film capacitor in which a tape-shaped film for a capacitor and metal layer are wound up (JP-S60-262414A, JP-H3-286514A, etc.); or the like.

Conventional and commonly known methods can be adopted without any specific limitations as methods by which these capacitors are produced.

[Metal Layer]

A metal layer of the capacitor may, without any specific limitations, be the same as a metal layer (also referred to as an electrode layer) of a conventional film capacitor.

The constituent metal of the metal layer is not specifically limited so long as it is an electrically conductive metal and may be aluminum, zinc, gold, platinum, copper, or the like, for example.

The metal layer may be formed by using a metal foil of any of these metals. Alternatively, a vapor deposition metal coating obtained through vapor deposition of a metal on the surface of the film for a capacitor can be used as the metal layer.

In a case in which the metal layer is formed using a metal foil, the thickness of the metal layer is not specifically limited but is preferably 0.1 μm or more, more preferably 1 μm or more, and particularly preferably 3 μm or more, and is preferably 100 μm or less, more preferably 50 μm or less, and particularly preferably 15 μm or less. In a case in which the metal layer is a vapor deposition metal coating, the thickness of the metal layer is not specifically limited but is preferably 1 nm or more, and preferably 20 nm or more, and is preferably 200 nm or less, and more preferably 100 nm or less.

The metal layer is preferably a vapor deposition metal coating because a thin metal layer having excellent close adherence with the film for a capacitor can be efficiently formed and because a smaller film capacitor having excellent durability can be produced.

In a case in which a vapor deposition metal coating is used as the metal layer, vacuum vapor deposition, sputtering, ion plating, or the like can be used as appropriate, without any specific limitations, as the method by which the vapor deposition metal coating is formed.

The vapor deposition metal coating may be a single layer or multiple layers. The multi-layer vapor deposition metal coating may, for example, be a vapor deposition metal coating described in JP-H2-250360A.

(Method of producing film for capacitor) The presently disclosed method of producing a film for a capacitor includes at least a stretching treatment step, a heat treatment step, and a relaxation treatment step, and may include other steps as necessary.

In the following description, "elongated" refers to a film having a length that is at least 5 times the width thereof, and preferably refers to a film having a length that is 10 times the width, or more, and that, more specifically, is of a length such that it can be wound up as a roll for storage or transportation. Moreover, when the direction of an element is described as "parallel", "perpendicular", or "orthogonal", this is inclusive of a margin of error of within ±5°, for example, unless specified otherwise, so long as the effects disclosed herein are not lost. Furthermore, the longitudinal direction of an elongated film is normally parallel to the film conveyance direction in a production line.

<Stretching Treatment Step>

The stretching treatment step is a step in which an unstretched film (web of film) is subjected to stretching treatment with a specific stretching temperature and stretching ratio.

The method by which the unstretched film is stretched can be any stretching method without any specific limitations. For example, the method of stretching may be a uniaxial stretching method such as a method in which the unstretched film is uniaxially stretched in a longitudinal direction (longitudinal uniaxial stretching) or a method in which the unstretched film is uniaxially stretched in a transverse direction (transverse uniaxial stretching); a biaxial stretching method such as simultaneous biaxial stretching in which the unstretched film is stretched in a longitudinal direction and is simultaneously stretched in a transverse direction or sequential biaxial stretching in which the unstretched film is stretched in one of a longitudinal direction and a transverse direction and is subsequently stretched in the other of the longitudinal direction and the transverse direction; a method in which the unstretched film is stretched in an oblique direction that is not parallel to or perpendicular to a transverse direction (oblique stretching); or the like.

The longitudinal uniaxial stretching may be a stretching method that utilizes a difference in circumferential speeds between rolls, for example.

The transverse uniaxial stretching may be a stretching method in which a tenter stretching machine is used, for example.

The simultaneous biaxial stretching may be a stretching method in which, using a tenter stretching machine including a plurality of clips that can secure the unstretched film and that are provided in a moveable manner along guide rails, intervals are opened between the clips to stretch the unstretched film in a longitudinal direction while simultaneously stretching the unstretched film in a transverse direction through the angle of widening of the guide rails, for example.

The sequential biaxial stretching may be a stretching method in which a difference in circumferential speeds between rolls is utilized to stretch the unstretched film in a longitudinal direction, and then both ends of the unstretched film are held by clips and the unstretched film is stretched in a transverse direction by a tenter stretching machine, for example.

The oblique stretching may be a stretching method in which the unstretched film is continuously stretched in an oblique direction using a tenter stretching machine that can apply feeding force, pulling force, or take-up force to the unstretched film with different speeds between left and right in a longitudinal direction or a transverse direction, for example.

[Unstretched Film (Web of Film)]

The unstretched film is a film that contains a hydrogenated dicyclopentadiene ring-opened polymer and that has not been stretched. The unstretched film can be produced through a resin molding method such as injection molding, extrusion molding, press molding, inflation molding, blow molding, calendering, cast molding, or compression molding. Of these methods, production of the unstretched film by extrusion molding is preferable because the thickness of the unstretched film can be easily controlled.

In a case in which the unstretched film (web of film) is produced by extrusion molding, the production conditions in the extrusion molding are as follows. The cylinder temperature (molten resin temperature) is not specifically limited but is preferably 250° C. or higher, and more preferably 260° C. or higher, and is preferably 330° C. or lower, and more preferably 310° C. or lower. The cast roll temperature is not specifically limited but is preferably 45° C. or higher, and is preferably 160° C. or lower, and more preferably 130° C. or lower. The cooling roll temperature is not specifically limited but is preferably 25° C. or higher, and more preferably 45° C. or higher, and is preferably 150° C. or lower, and more preferably 120° C. or lower.

The thickness of the unstretched film is not specifically limited but is preferably 1 μm or more, and more preferably 2 μm or more, and is preferably 1 mm or less, and more preferably 500 μm or less.

[Stretching Temperature]

The stretching temperature is not specifically limited but, in terms of inhibiting film rupture during stretching and reduction of productivity due to clip detachment, is preferably not lower than the glass-transition temperature Tg of the hydrogenated dicyclopentadiene ring-opened polymer, and, more specifically, is preferably 95° C. or higher, more preferably 100° C. or higher, even more preferably 105° C. or higher, and particularly preferably 110° C. or higher. Moreover, in terms of enabling efficient production of a film for a capacitor having a small heat shrinkage ratio, the stretching temperature is preferably not higher than the melting point Tm of the hydrogenated dicyclopentadiene ring-opened polymer, and, more specifically, is preferably 120° C. or lower, more preferably 118° C. or lower, and particularly preferably 116° C. or lower.

By setting the stretching temperature as not lower than the glass-transition temperature Tg of the hydrogenated dicyclopentadiene ring-opened polymer and not higher than the melting point Tm of the hydrogenated dicyclopentadiene ring-opened polymer, polymer molecules contained in the unstretched film can be caused to suitably align.

[Stretching Ratio]

The stretching ratio is not specifically limited but is preferably 1.5 times or more, more preferably 1.52 times or more, even more preferably 1.55 times or more, and particularly preferably 1.58 times or more in terms of enabling efficient production of a film for a capacitor having a high softening point, and is preferably 10 times or less, preferably 5 times or less, more preferably 4.5 times or less, and particularly preferably 4 times or less in terms of enabling efficient production of a film for a capacitor having excellent toughness. Note that in a case in which stretching is performed in a plurality of different directions like in biaxial stretching, for example, the stretching ratio is the total stretching ratio expressed by the product of the stretching ratios in the various stretching directions. Also note that setting the stretching ratio as not more than the upper limit of any of the ranges set forth above makes it easy to produce a film for a capacitor because the likelihood of the film rupturing is reduced.

[Stretching Rate]

The stretching rate is not specifically limited but is preferably 100 mm/min or more, more preferably 150 mm/min or more, and particularly preferably 200 mm/min or more in terms of enabling efficient production of a film for a capacitor having a high softening point, and is preferably 30,000 mm/min or less, more preferably 20,000 mm/min or less, and particularly preferably 5,000 mm/min or less in terms of inhibiting film rupture during stretching and reduction of productivity due to clip detachment.

By subjecting the unstretched film to stretching treatment in this manner, a film for a capacitor having desired characteristics can be obtained. Moreover, performing stretching treatment of the unstretched film can inhibit formation of large crystal grains in the heat treatment step (crystallization step) to thereby inhibit whitening caused by these crystal grains, and, as a consequence, can increase the transparency of the film for a capacitor.

<Heat Treatment Step>

The heat treatment step is a step in which a stretched film that has been stretched in the stretching treatment step is subjected to heat treatment with a specific heating temperature and heating time.

Any commonly known method can be adopted as appropriate, without any specific limitations, as the method of heating in heat treatment of the stretched film obtained through the previously described stretching treatment.

The heating method may be a method in which the stretched film is secured to a stage and is subsequently heated using a heating device such as a heat treatment oven or an infrared heater.

[Heating Temperature]

The heating temperature is not specifically limited but is preferably 150° C. or higher, more preferably 160° C. or higher, even more preferably 170° C. or higher, and particularly preferably 180° C. or higher in terms of enabling efficient production of a film for a capacitor having a small heat shrinkage ratio, and is preferably 240° C. or lower, more preferably 220° C. or lower, and particularly preferably 210° C. or lower in terms of enabling efficient production of a film for a capacitor having a small heat shrinkage ratio.

[Heating Time]

The heating time is not specifically limited but is preferably 0.1 minutes or more, more preferably 0.2 minutes or more, even more preferably 0.3 minutes or more, and particularly preferably 0.4 minutes or more in terms of enabling efficient production of a film for a capacitor having a small heat shrinkage ratio, and is preferably 600 minutes or less, more preferably 300 minutes or less, even more preferably 200 minutes or less, further preferably 100 minutes or less, and particularly preferably 30 minutes or less in terms of enabling efficient production of a film for a capacitor having a small tan $\delta$.

The heating device used in this heating is preferably a heating device that can raise the temperature of the atmosphere surrounding the stretched film because this makes it unnecessary for the heating device and the stretched film to be in contact. Specific examples of suitable heating devices include ovens and heating furnaces.

After a stretched film is prepared, the stretched film is subjected to the heat treatment step in order to cause crystallization of the hydrogenated dicyclopentadiene ring-opened polymer contained in the stretched film. In the heat treatment step, crystallization treatment is performed to cause crystallization of the hydrogenated dicyclopentadiene ring-opened polymer by adopting a specific temperature range while the stretched film is in a tense state with at least two edges thereof held.

The "tense state" of the stretched film is a state in which tension is acting on the stretched film. However, this tense state of the stretched film is not inclusive of a state in which the stretched film is substantially further stretched. The phrase "substantially further stretched" normally refers to the stretching ratio of the stretched film in any direction being 1.1 times or more.

In a situation in which the stretched film is held, the stretched film is held by suitable holding implements. The holding implements may be implements that can hold edges of the stretched film continuously along the entire length thereof or implements that can hold edges of the stretched film intermittently with intervals in-between. For example, an edge of the stretched film may be held intermittently by holding implements arranged at a specific interval.

In the heat treatment step, the stretched film is in a tense state with at least two edges of the stretched film being held. This prevents deformation of the stretched film due to heat shrinkage in a region between the held edges. In order to prevent deformation of a large area of the stretched film, it is preferable that edges including at least two opposing edges are held and that a region between the held edges is in a tense state. In the case of a stretched film that is a rectangular single sheet, for example, deformation of the entirety of the single-sheet stretched film can be prevented by holding two opposing edges (for example, long edges or short edges) of the stretched film with a region between the two edges in a tense state. Moreover, in the case of an elongated stretched film, deformation of the entirety of the elongated stretched film can be prevented by holding two edges at transverse direction ends of the stretched film (i.e., long edges) with a region between the two edges in a tense state. By preventing deformation of the stretched film in this manner, deformation such as wrinkling can be inhibited even when stress arises in the film due to heat shrinkage.

Holding of more edges is preferable for more reliably inhibiting deformation in the heat treatment step. Accordingly, in the case of a single-sheet stretched film, for example, it is preferable that all of the edges of the stretched film are held. As a specific example, it is preferable that four edges are held in the case of a stretched film that is a rectangular single sheet.

The holding implements that can hold edges of the stretched film are preferably implements that are not in contact with sections of the stretched film other than the edges thereof. By using such holding implements, it is possible to obtain a film for a capacitor having better smoothness.

Moreover, the holding implements are preferably implements for which the positions thereof relative to one another can be fixed during the heat treatment step. Since the positions of such holding implements do not move relative to one another in the heat treatment step, substantial further stretching of the stretched film in the heat treatment step can be easily inhibited.

Suitable examples of holding implements include, in the case of holding implements for a rectangular stretched film, for example, holders such as clips that are provided at specific intervals on a frame and that can hold edges of the stretched film. Moreover, suitable examples in the case of holding implements for holding two edges at transverse direction ends of an elongated stretched film include holders that are provided in a tenter stretching machine and that can hold the edges of the stretched film.

In a case in which an elongated stretched film is used, edges at longitudinal direction ends of the stretched film (i.e., short edges) may be held, or, instead of holding these edges, both sides in a longitudinal direction of a region of the stretched film subjected to the heat treatment step may be held. For example, a holding device that can hold the stretched film in a tense state such that heat shrinkage does not occur may be provided at both sides in a longitudinal direction of a region of the stretched film that is subjected to the heat treatment step. This holding device may, for example, be a combination of two rolls, a combination of an extruder and a take-up roll, or the like.

By applying tension such as conveying tension to the stretched film through such a combination, heat shrinkage of the stretched film can be inhibited in a region that is subjected to the heat treatment step. Therefore, a film for a capacitor can be efficiently produced by using such a combination as a holding device because the stretched film can be held while also being conveyed in the longitudinal direction.

In the heat treatment step, the stretched film is set to a temperature of not lower than the glass-transition temperature Tg of the hydrogenated dicyclopentadiene ring-opened polymer and not higher than the melting point Tm of the hydrogenated dicyclopentadiene ring-opened polymer (temperature of 150° C. to 240° C.) while the stretched film is in a tense state with at least two edges thereof held as described above. Crystallization of the hydrogenated dicyclopentadiene ring-opened polymer proceeds in the stretched film that is set to a temperature such as described above. Consequently, a heated and stretched film (crystallized film) containing a crystallized hydrogenated dicyclopentadiene ring-opened polymer is obtained through the heat treatment step. Since the heated and stretched film is placed in a tense state while preventing deformation thereof, crystallization can be caused to proceed without loss of smoothness of the heated and stretched film.

<Relaxation Treatment Step>

The relaxation treatment step is a step in which the stretched film that has been heated in the heat treatment step is subjected to relaxation treatment with a specific relaxation temperature and relaxation time and with a specific reduction ratio of film fixed width.

[Relaxation Temperature]

The relaxation temperature is not specifically limited but is preferably 150° C. or higher, more preferably 160° C. or higher, even more preferably 170° C. or higher, and particularly preferably 180° C. or higher in terms of enabling efficient production of a film for a capacitor having a small heat shrinkage ratio, and is preferably 240° C. or lower, more preferably 220° C. or lower, and particularly preferably 210° C. or lower in terms of enabling efficient production of a film for a capacitor having a small tan δ.

In a case in which the relaxation treatment step follows the heat treatment step without intervening cooling, the treatment temperature of the heated and stretched film in the relaxation treatment step is preferably the same as the temperature in the heat treatment step. This can inhibit non-uniformity of the temperature of the heated and stretched film in the relaxation treatment step and can increase productivity of the film for a capacitor.

[Relaxation Time]

The relaxation time is not specifically limited but is preferably 0.1 minutes or more, more preferably 0.2 minutes or more, even more preferably 0.3 minutes or more, and particularly preferably 0.4 minutes or more in terms of enabling efficient production of a film for a capacitor having a small heat shrinkage ratio, and is preferably 600 minutes or less, more preferably 300 minutes or less, even more preferably 200 minutes or less, and particularly preferably 100 minutes or less in terms of enabling efficient production of a film for a capacitor having a small tan δ.

[Reduction Ratio of Film Fixed Width]

With regards to the reduction ratio of film fixed width, the lengthwise reduction ratio and the widthwise reduction ratio are not specifically limited but are each preferably more than 0%, more preferably 0.2% or more, even more preferably 0.4% or more, and particularly preferably 0.6% or more in terms of enabling efficient production of a film for a capacitor having a small heat shrinkage ratio, and are each preferably 20% or less, more preferably 15% or less, even more preferably 13% or less, and particularly preferably 10% or less in terms of uniformity of the surface (planar shape) of the film.

Note that the "reduction ratio of film fixed width" is the proportion by which a holding interval of the film is narrowed in the relaxation treatment step.

The relaxation treatment step is performed after the heat treatment step in order to cause heat shrinkage of the heated and stretched film obtained through the heat treatment step and eliminate residual stress. In the relaxation treatment step, the heated and stretched film obtained through the heat treatment step is kept flat while performing relaxation treatment of relaxing tensing of the heated and stretched film in a specific temperature range.

Relaxation of tensing of the heated and stretched film refers to the release of the heated and stretched film from a tense state in which it is held by a holding device, and the heated and stretched film may still be held by the holding device so long as the heated and stretched film is not tense. Relaxation of tensing in this manner places the heated and stretched film in a state in which heat shrinkage can occur. The relaxation treatment step relieves stress that can arise in the film for a capacitor during heating by allowing heat shrinkage of the heated and stretched film to occur. Therefore, since heat shrinkage of the presently disclosed film for a capacitor in high-temperature environments can be reduced, a film for a capacitor having excellent dimensional stability in high-temperature environments is obtained.

Relaxation of tensing of the heated and stretched film may be performed all at once or may be performed over time, either continuously or stepwise. However, it is preferable that relaxation of tensing is performed continuously or stepwise in order to inhibit the occurrence of deformation such as rippling or wrinkling in the obtained film for a capacitor.

The relaxation of tensing of the heated and stretched film is performed while keeping the heated and stretched film flat. Keeping the heated and stretched film flat means that a flat plane shape of the heated and stretched film is maintained such that deformation of the heated and stretched film, such as rippling and wrinkling, does not occur. This can inhibit the occurrence of deformation such as rippling and wrinkling in the obtained film for a capacitor.

In a case in which a single-sheet heated and stretched film is subjected to relaxation treatment in the relaxation treatment step described above, a method may be adopted in which four edges of the heated and stretched film are held while narrowing the interval between held sections continuously or stepwise, for example. In this case, the interval between held sections may be narrowed simultaneously at the four edges of the heated and stretched film.

Alternatively, the interval between held sections may be narrowed at some edges and the interval between held sections may subsequently be narrowed at other edges. Further alternatively, the interval between held sections may be maintained at some edges without being narrowed. Moreover, the interval between held sections may be narrowed continuously or stepwise at some edges and the interval between held sections may be narrowed all at once at other edges.

In a case in which a heated and stretched film that is elongated is subjected to relaxation treatment in the relaxation treatment step described above, a method may be adopted in which, using a tenter stretching machine, the interval between guide rails that can guide clips is narrowed in a conveyance direction of the heated and stretched film and/or the interval between adjacent clips is narrowed, for example.

In a case in which relaxation of tensing of the heated and stretched film is performed by narrowing the interval between held sections in a state in which the heated and stretched film is held as described above, the degree to which the interval is narrowed can be set in accordance with the magnitude of residual stress in the heated and stretched film that is obtained in the heat treatment step.

A large amount of stress tends to remain in a heated and stretched film obtained through implementation of the heat treatment step. Therefore, the degree of narrowing of the interval between held sections in order to relax tensing of the heated and stretched film is preferably large.

<<Example of Heat Treatment Step and Relaxation Treatment Step>>

The following describes an example of the heat treatment step and the relaxation treatment step described above. This example is an example of a method of producing a single-sheet film for a capacitor using a single-sheet stretched film. However, the heat treatment step and the relaxation treatment step are not limited to this example.

Figure 2:
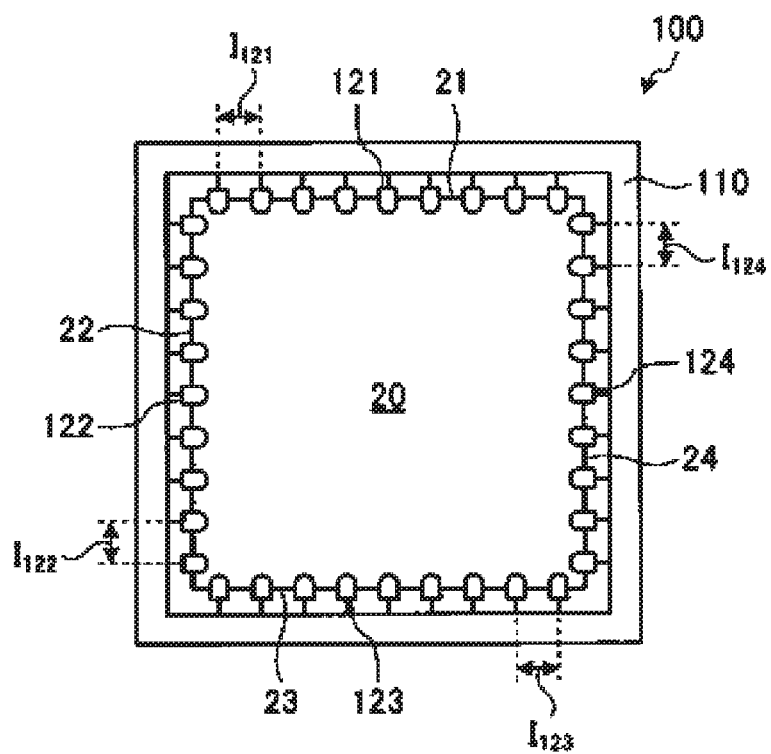
FIG. 2 is a plan view schematically illustrating an example of a holding device.

FIGS. 1 and 2 are plan views schematically illustrating an example of a holding device.

As illustrated in FIG. 1, a holding device 100 is a device for holding a single-sheet stretched film (web of film) 10 and includes a frame 110 and clips 121, 122, 123, and 124 as a plurality of holding implements that are provided on the frame 110 in a manner such that positions thereof are adjustable. The clips 121, the clips 122, the clips 123, and the clips 124 are disposed such that these clips can respectively hold an edge 11, an edge 12, an edge 13, and an edge 14 of the stretched film 10.

In a case in which the heat treatment step is performed using such a holding device 100, a stretched film 10 formed of a resin including a hydrogenated dicyclopentadiene ring-opened polymer is set up in the holding device 100. Specifically, the stretched film 10 is held by the clips 121 to 124 such that the stretched film 10 is in a tense state with the four edges 11 to 14 thereof held. In this tense state, the stretched film 10 is heated in a temperature range of not lower than the glass-transition temperature Tg of the hydrogenated dicyclopentadiene ring-opened polymer contained in the stretched film 10 and not higher than the melting point Tm of the hydrogenated dicyclopentadiene ring-opened polymer (temperature range of 150° C. to 240° C.) by an oven (not illustrated).

This causes crystallization of the hydrogenated dicyclopentadiene ring-opened polymer contained in the stretched film 10 to proceed such that a heated and stretched film (crystallized film) 20 is obtained as illustrated in FIG. 2. During this heating, deformation due to heat shrinkage of the heated and stretched film 20 does not occur because the stretched film 10 is in a tense state with the four edges 11 to 14 thereof held. Consequently, stress acting to cause heat shrinkage normally remains in the heated and stretched film 20.

The heated and stretched film 20 produced as described above is subsequently subjected to the relaxation treatment step. At the end of the heat treatment step, the heated and stretched film 20 is in a state with an edge 21, an edge 22, an edge 23, and an edge 24 thereof held by the clips 121, the clips 122, the clips 123, and the clips 124 of the holding device 100. In the relaxation treatment step, intervals $I_{121}$, $I_{122}$, $I_{123}$, and $I_{124}$ between the clips 121 to 124 of the holding device 100 are narrowed while the heated and stretched film 20 continues to be in a heated state in a temperature range of not lower than the glass-transition temperature Tg of the hydrogenated dicyclopentadiene ring-opened polymer and not higher than the melting point Tm of the hydrogenated dicyclopentadiene ring-opened polymer (temperature range of 150° C. to 240° C.). Accordingly, the intervals between held sections of the heated and stretched film 20 that are held by the clips 121 to 124 narrow such as to track dimensional change caused by heat shrinkage of the heated and stretched film 20. Therefore, tensing of the heated and stretched film 20 is relaxed while keeping the heated and stretched film 20 flat, and a single-sheet film for a capacitor is obtained.

<Other Steps>

No specific limitations are placed on other steps, and surface treatment of the obtained film for a capacitor may be performed, for example.

EXAMPLES

The following provides a more specific description of the present disclosure based on examples. However, the present disclosure is not limited to the following examples.

In the following description, "%" and "parts" used in expressing quantities are by mass, unless otherwise specified. Moreover, operations described below were performed at normal temperature and normal pressure, unless otherwise specified.

In the examples and comparative examples, (1) the molecular weight (weight-average molecular weight and number-average molecular weight) of a ring-opened polymer of dicyclopentadiene, (2) the glass-transition temperature and melting point of a hydrogenated product of a ring-opened polymer of dicyclopentadiene, (3) the proportion of racemo diads in a hydrogenated product of a ring-opened polymer of dicyclopentadiene, (4) the softening point (° C.) of a film for a capacitor, (5) the heat shrinkage ratio (%) of a film for a capacitor, (6) tan δ of a film for a capacitor, (7) the coefficient of static friction of a film for a capacitor, (8) the plane orientation factor of a film for a capacitor, (9) the density (g/cm$^3$) of a film for a capacitor, and (10) the thickness (μm) of a film for a capacitor were measured by methods described below, and (11) evaluation of dielectric breakdown strength, (12) evaluation of metal vapor deposition properties, and (13) evaluation of formability were performed by methods described below.

<(1) Molecular Weight (Weight-Average Molecular Weight and Number-Average Molecular Weight) of Ring-Opened Polymer of Dicyclopentadiene>

A solution containing a ring-opened polymer of dicyclopentadiene was sampled to obtain a measurement sample. The obtained measurement sample was used to determine the molecular weight of the ring-opened polymer of dicyclopentadiene as a polystyrene-equivalent value using a gel permeation chromatography (GPC) system HLC-8320 (produced by Tosoh Corporation) and an H-type column (produced by Tosoh Corporation) at a temperature of 40° C. and with tetrahydrofuran as a solvent.

<(2) Glass-Transition Temperature and Melting Point of Hydrogenated Product of Ring-Opened Polymer of Dicyclopentadiene>

An obtained hydrogenated product of a ring-opened polymer of dicyclopentadiene was used as a measurement sample. The obtained measurement sample was heated to 320° C. and was then rapidly cooled to room temperature at a cooling rate of −10° C./min using liquid nitrogen in a nitrogen atmosphere. A differential scanning calorimeter (DSC) was then used to heat the measurement sample at 10° C./min and to thereby determine the glass-transition temperature and the melting point of the hydrogenated product of the ring-opened polymer of dicyclopentadiene.

<(3) Proportion of Racemo Diads in Hydrogenated Product of Ring-Opened Polymer of Dicyclopentadiene>

An obtained hydrogenated product of a ring-opened polymer of dicyclopentadiene was used as a measurement sample. The proportion of racemo diads (meso/racemo ratio) was determined through $^{13}$C-NMR measurement by an inverse-gated decoupling method performed at 200° C. with orthodichlorobenzene-$d_4$/1,2,4-trichlorobenzene-$d_3$ (TCB-$d_3$) (mixing ratio (by mass)=1/2) as a solvent. Specifically, the proportion of racemo diads was determined from an intensity ratio of a signal at 43.35 ppm attributed to meso diads and a signal at 43.43 ppm attributed to racemo diads, with a peak at 127.5 ppm for orthodichlorobenzene-$d_4$ taken as a standard shift.

<(4) Softening Point of Film for Capacitor>

A circle of 5 mm in diameter was cut out at an arbitrary location in an obtained film for a capacitor as a measurement sample. The obtained measurement sample was heated under a heating condition of 10° C./min using a thermomechanical analyzer (SS6100 produced by Hitachi High-Tech Science Corporation), and the softening point of the film for a capacitor was measured. The measurement results are shown in Table 1.

<(5) Heat Shrinkage Ratio of Film for Capacitor (%)>

A square of 500 mm×500 mm was cut out at an arbitrary location in an obtained film for a capacitor as a measurement sample. When cutting out this square, it was ensured that the edges of the square matched the machine direction (MD) and the transverse direction (TD) in production of the film for a capacitor.

The obtained measurement sample was heated at 200° C. using an oven for 10 minutes, the amounts of change in the MD length and the TD length between before and after heating were determined, and the heat shrinkage ratio of the film for a capacitor was calculated. Note that the heat shrinkage ratio is an average value for MD and TD. The measurement results are shown in Table 1.

<(6) Tan δ of Film for Capacitor>

An obtained film for a capacitor was cut out as 150 mm×1 mm at an arbitrary location to obtain a measurement sample. The obtained measurement sample was used to measure tan δ at a frequency of 1 GHz using a Network Analyzer (N5230A produced by Agilent Technologies, Inc.). The measurement results are shown in Table 1.

<(7) Coefficient of Static Friction of Film for Capacitor>

The coefficient of static friction between a film for a capacitor and a ball indenter was measured in accordance with ASTM D1894 using a TriboGear Surface Property Meter (TYPE38 produced by SHINTO Scientific Co., Ltd.). The load was set as 200 g and the speed was set as 100 mm/min. The measurement results are shown in Table 1.

<(8) Plane Orientation Factor of Film for Capacitor>

A refractive index meter (AxoScan produced by Axometrics, Inc.) for refractive index measurement was used to measure the refractive index of an obtained film for a capacitor in MD, TD, and ND (thickness) directions (respectively denoted as Nx, Ny, and Nz), and the plane orientation factor of the film for a capacitor was calculated by the following formula (2).

$$\Delta P=(Nx+Ny)/2-Nz \qquad (2)$$

Note that a large value for the plane orientation factor indicates that the refractive index in an MD-TD plane (Nx and Ny) is high and that molecular chains are oriented in the plane. The measurement results are shown in Table 1.

<(9) Density of Film for Capacitor (g/Cm$^3$)>

The density (g/cm$^3$) of an obtained film for a capacitor was measured using an automatic densimeter (produced by Toyo Seiki Seisaku-Sho, Ltd.; product name: DSG-1). The measurement results are shown in Table 1.

<(10) Thickness of Film for Capacitor (μm)>

The thickness (μm) of an obtained film for a capacitor was measured using a film thickness meter (produced by Fujiwork Co., Ltd.; product name: HKT-1216). The measurement results are shown in Table 1.

<(11) Evaluation of Dielectric Breakdown Strength>

The dielectric breakdown strength of an obtained film for a capacitor was measured in accordance with the plate electrode method described in JIS C2151. The measurement results (23° C., 120° C., 150° C.) are shown in Table 1. Note that a dielectric strength voltage measurement device (YST-243-100RHO produced by Yamayo Shikenki) was used as a measurement device and the dielectric breakdown strength was taken to be an average value of the dielectric breakdown voltage divided by the thickness of the film for a capacitor. Moreover, for measurements at 120° C. and 150° C., the electrodes and the measurement sample were set in a hot air oven, were held therein for 10 minutes, and then the voltage was increased to perform measurement in accordance with the plate electrode method described in JIS C2151 in the same way as above.

The dielectric breakdown strength was evaluated by the following evaluation standard. The evaluation results are shown in Table 1.

<<Evaluation Standard>>

Good: Retention of dielectric breakdown strength at 150° C. relative to dielectric breakdown strength at 23° C. is 60% or more Poor: Retention of dielectric breakdown strength at 150° C. relative to dielectric breakdown strength at 23° C. is less than 60%

<(12) Evaluation of Metal Vapor Deposition Properties>

The surface of an obtained film was subjected to corona treatment, and vacuum vapor deposition of aluminum was performed such that the surface resistance was 5 Ω/sq. During the above, a striped margin of 4 mm in width was provided in parallel to the longitudinal direction. Metal vapor deposition properties were evaluated by the following evaluation standard. The evaluation results are shown in Table 1.

<<Evaluation Standard>>

Good: No thermal deformation during vacuum vapor deposition, no vapor deposition non-uniformity at metal vapor deposition surface, and no distortion of margin Mediocre: No thermal deformation during vacuum vapor deposition but vapor deposition non-uniformity at metal vapor deposition surface Poor: Thermal deformation during vacuum vapor deposition <(13) Evaluation of Formability>

An obtained metal vapor deposition film was cut to 300 mm in length and 40 mm in width, 15 cut-out films were stacked such that vapor deposition surfaces were in contact with non-vapor deposition surfaces, and the stacked films were wound up to produce a roll while ensuring that end surface misalignment did not occur. Thereafter, the obtained roll was hot pressed at a temperature of 120° C. The roll was visually inspected for the presence of the following modes of failure after hot pressing. The evaluation results are shown in Table 1.

<<Modes of Failure>>

Winding misalignment of end of roll due to hot pressing
Non-matching total thickness of sections that are symmetrical with the center taken as a reference
Film twisting or gaps when cross-section of roll formed through cutting Five rolls were produced in the same way as described above and the number of rolls in which a mode of failure was observed was evaluated as follows. Formability was evaluated by the following evaluation standard. The evaluation results are shown in Table 1.

<<Evaluation Standard>>

Excellent: 0 rolls
Good: 1 roll
Poor: 2 or more rolls

Production Example 1: Production of Hydrogenated Product of Ring-Opened Polymer of Dicyclopentadiene A metal pressure-resistant reactor that had been internally purged with nitrogen was charged with 154.5 parts of cyclohexane as an organic solvent, 42.8 parts (30 parts in terms of dicyclopentadiene) of a cyclohexane solution (concentration: 70%) of dicyclopentadiene (endo isomer content ratio: 99% or more) as a dicyclopentadiene, and 1.91 parts of 1-hexene as a molecular weight modifier. The contents of the pressure-resistant reactor were heated to 53° C. Meanwhile, a ring-opening polymerization catalyst solution was prepared by adding 0.061 parts of an n-hexane solution (concentration: 19%) of diethylaluminum ethoxide (organometallic reducing agent) as a ring-opening polymerization catalyst to a solution obtained through dissolution of 0.014 parts of a tetrachlorotungsten phenylimide (tetrahydrofuran) complex (metal compound) as a ring-opening polymerization catalyst in 0.70 parts of toluene (organic solvent), and then performing mixing for 10 minutes. This ring-opening polymerization catalyst solution was added into the reactor and a ring-opening polymerization reaction was carried out for 4 hours at 53° C. to obtain a solution containing a dicyclopentadiene ring-opened polymer.

The polymerization reaction was stopped by adding 0.037 parts of 1,2-ethanediol as an inhibitor to 200 parts of the obtained solution containing the dicyclopentadiene ring-opened polymer and performing stirring for 1 hour at 60° C. Thereafter, 1 part of a hydrotalcite-like compound (product name: KYOWAAD® 2000 (KYOWAAD is a registered trademark in Japan, other countries, or both); produced by Kyowa Chemical Industry Co., Ltd.) was added as an adsorbent, heating was performed to 60° C., and stirring was performed for 1 hour. Next, 0.4 parts of a filter aid (product name: Radiolite® #1500 (Radiolite is a registered trademark in Japan, other countries, or both); produced by Showa Chemical Industry Co., Ltd.) was added and the adsorbent was filtered off using a PP pleated cartridge filter (product name: TCP-HX; produced by Advantec Toyo Kaisha, Ltd.) to obtain a solution containing the dicyclopentadiene ring-opened polymer.

A portion of this solution was used to measure the molecular weight of the dicyclopentadiene ring-opened polymer. The weight-average molecular weight (Mw) was 28,100, the number-average molecular weight (Mn) was 8,750, and the molecular weight distribution (Mw/Mn) was 3.21.

Next, 100 parts of cyclohexane and 0.0043 parts of chlorohydridocarbonyltris(triphenylphosphine)ruthenium were added to 200 parts of the obtained solution containing the dicyclopentadiene ring-opened polymer (polymer content: 30 parts), and a hydrogenation reaction was carried out for 4 hours at a hydrogen pressure of 6 MPa and a temperature of 180° C. The reaction liquid was a slurry in which solid content had precipitated.

Solid content and solution were separated through centrifugal separation of the reaction liquid, and then the solid content was dried under reduced pressure at 60° C. for 24 hours to obtain 28.5 parts of a hydrogenated product of the dicyclopentadiene ring-opened polymer.

The percentage hydrogenation of unsaturated bonds in the hydrogenation reaction was 99% or more. The hydrogenated product of the dicyclopentadiene ring-opened polymer had a glass-transition temperature of 98° C. and a melting point of 262° C. The proportion of racemo diads was 89%. Note that the percentage hydrogenation of the polymer was calculated through $^1$H-NMR measurement performed at 145° C. with orthodichlorobenzene-$d_4$ as a solvent.

Production Example 2: Production of Unstretched Film

A resin for use as a film material was obtained by mixing 1.1 parts of an antioxidant (tetrakis[methylene-3-(3',5'-di-t-butyl-4'-hydroxyphenyl)propionate]methane; Irganox® 1010 (Irganox is a registered trademark in Japan, other countries, or both) produced by BASF Japan Ltd.) with 100 parts of the hydrogenated product of the ring-opened polymer of dicyclopentadiene obtained in Production Example 1.

This resin was loaded into a twin-screw extruder (TEM-37B produced by Toshiba Machine Co., Ltd.) including 4 die holes having an internal diameter of 3 mm. The twin-screw extruder was used to shape a shaped product having a strand form through hot melt-extrusion of the resin. The shaped product was finely cut by a strand cutter to obtain pellets of the resin.

The operating conditions of the twin-screw extruder were as follows.

Barrel temperature setting: 270° C. to 280° C.
Die temperature setting: 250° C.
Screw speed: 145 rpm
Feeder speed: 50 rpm Next, the obtained pellets were supplied into a hot melt-extrusion film forming machine including a T-die. The film forming machine was used to produce an elongated unstretched film (thickness: 50 μm; edge length: 155 mm) formed of the resin by a method in which the elongated unstretched film was wound up by a roll at a speed of 2 m/min. The operating conditions of the film forming machine were as follows. Note that the thickness of the unstretched film and the edge length of the unstretched film were adjusted by adjusting the screw speed as appropriate.

Barrel temperature setting: 280° C. to 290° C.
Die temperature: 270° C.
Screw speed: 30 rpm The measured haze of the obtained unstretched film was 0.2%.

Note that the haze of the unstretched film was measured by cutting out a square thin-film sample of 50 mm×50 mm at an arbitrarily selected location in the unstretched film, and then measuring the haze of the thin-film sample using a haze meter (5000 produced by Nippon Denshoku Industries Co., Ltd.).

Example 1

<1-1. Stretching Treatment Step>

A square of 90 mm×90 mm was cut out at an arbitrary location in the elongated unstretched film obtained in Production Example 2. This cutting was performed such that edges of the cut-out square of the unstretched film were each parallel to a longitudinal direction or a transverse direction of the elongated unstretched film. The cut-out unstretched film was set up in a multi-tank type biaxial stretching birefringence orientation axis measurement device (produced by Eto Co., Ltd.). The multi-tank type biaxial stretching birefringence orientation axis measurement device included a plurality of clips that could hold four edges of a film and had a structure that enabled stretching of a film through movement of these clips. The multi-tank type biaxial stretching birefringence orientation axis measurement device was used to stretch the unstretched film in a lengthwise direction corresponding to the longitudinal direction of the elongated unstretched film with a stretching ratio of 1.48 times and subsequently in a widthwise direction corresponding to the transverse direction of the elongated unstretched film with a stretching ratio of 1.48 times (stretched with a total stretching ratio of 2.2 times) to obtain a stretched film. The operating conditions of the multi-tank type biaxial stretching birefringence orientation axis measurement device were as follows.

Stretching rate: 200 mm/min
Stretching temperature: 110° C.

<1-2. Heat Treatment Step>

The four edges of the stretched film were held by the clips of the multi-tank type biaxial stretching birefringence orientation axis measurement device so as to attach the stretched film in the multi-tank type biaxial stretching birefringence orientation axis measurement device. The stretched film was placed in a tense state by holding the four edges of the stretched film using the clips. The stretched film was then subjected to heat treatment in an oven at 200° C. for 30 seconds to perform a crystallization step of crystallizing the hydrogenated product of the ring-opened polymer of dicyclopentadiene contained in the stretched film to obtain a heated and stretched film.

The measured haze of the obtained heated and stretched film was 0.36%.

Note that the haze of the heated and stretched film was measured by cutting out a square thin-film sample of 50 mm×50 mm at an arbitrarily selected location in the heated and stretched film, and then measuring the haze of the thin-film sample using a haze meter (5000 produced by Nippon Denshoku Industries Co., Ltd.).

<1-3. Relaxation Treatment Step>

The four edges of the heated and stretched film obtained in this manner were held by the clips of the multi-tank type biaxial stretching birefringence orientation axis measurement device so as to attach the heated and stretched film in the multi-tank type biaxial stretching birefringence orientation axis measurement device. A relaxation treatment step of relaxing tensing of the heated and stretched film (crystallized film) at a temperature of 200° C. while keeping the heated and stretched film flat was performed to obtain a film for a capacitor. In the relaxation treatment step, tensing of the heated and stretched film was relaxed by moving the clips of the multi-tank type biaxial stretching birefringence orientation axis measurement device in an in-plane direction of the heated and stretched film so as to reduce the inter-clip distance. The inter-clip distance was reduced by 3% in the lengthwise direction of the heated and stretched film and 3% in the widthwise direction of the heated and stretched film over 30 seconds.

The softening point (° C.), heat shrinkage ratio (%), tan δ, coefficient of static friction, plane orientation factor, density (g/cm$^3$), and thickness (μm) of the film for a capacitor obtained in this manner were measured by the previously described methods. Moreover, the dielectric breakdown strength, metal vapor deposition properties, and formability of the obtained film for a capacitor were evaluated by the previously described methods.

Example 2

Operations, measurements, and evaluations were performed in the same way as in Example 1 with the exception that instead of using an unstretched film having a thickness of 50 μm and an edge length of 155 mm, setting the total stretching ratio in "1-1. Stretching treatment step" as 2.2 times, and setting the reduction ratio in "1-3. Relaxation treatment step" as 3% lengthwise and 3% widthwise in Example 1, an unstretched film having a thickness of 100 μm and an edge length of 115 mm was used, the total stretching ratio in "1-1. Stretching step" was set as 3.1 times (lengthwise direction: 1.76 times; widthwise direction: 1.76 times), and the reduction ratio in "1-3. Relaxation treatment step" was set as 5% lengthwise and 5% widthwise.

Example 3

Operations, measurements, and evaluations were performed in the same way as in Example 1 with the exception that instead of using an unstretched film having a thickness of 50 μm and an edge length of 155 mm, setting the heating temperature in "1-2. Heat treatment step" as 200° C., and setting the relaxation temperature in "1-3. Relaxation treatment step" as 200° C. in Example 1, an unstretched film having a thickness of 25 μm and an edge length of 155 mm was used, the heating temperature in "1-2. Heat treatment step" was set as 240° C., and the relaxation temperature in "1-3. Relaxation treatment step" was set as 240° C.

Example 4

Operations, measurements, and evaluations were performed in the same way as in Example 1 with the exception that instead of using an unstretched film having a thickness of 50 μm and an edge length of 155 mm, setting the stretching temperature in "1-1. Stretching treatment step" as 110° C., and setting the stretching rate in "1-1. Stretching treatment step" as 200 mm/min in Example 1, an unstretched film having a thickness of 20 μm and an edge length of 155 mm was used, the stretching temperature in "1-1. Stretching treatment step" was set as 95° C., and the stretching rate in "1-1. Stretching treatment step" was set as 1,000 mm/min.

Example 5

Operations, measurements, and evaluations were performed in the same way as in Example 1 with the exception that instead of using an unstretched film having a thickness of 50 μm and an edge length of 155 mm, setting the stretching temperature in "1-1. Stretching treatment step" as 110° C., setting the total stretching ratio in "1-1. Stretching treatment step" as 2.2 times, setting the heating time in "1-2. Heat treatment step" as 0.5 minutes, setting the relaxation time in "1-3. Relaxation treatment step" as 0.5 minutes, and setting the reduction ratio in "1-3. Relaxation treatment step" as 3% lengthwise and 3% widthwise in Example 1, an unstretched film having a thickness of 20 μm and an edge length of 210 mm was used, the stretching temperature in "1-1. Stretching treatment step" was set as 115° C., the total stretching ratio in "1-1. Stretching treatment step" was set as 1.6 times (lengthwise direction: 1.26 times; widthwise direction: 1.26 times), the heating time in "1-2. Heat treatment step" was set as 20 minutes, the relaxation time in "1-3. Relaxation treatment step" was set as 3 minutes, and the reduction ratio in "1-3. Relaxation treatment step" was set as 1% lengthwise and 1% widthwise.

Example 6

Operations, measurements, and evaluations were performed in the same way as in Example 1 with the exception that instead of using an unstretched film having a thickness of 50 μm and an edge length of 155 mm, setting the total stretching ratio in "1-1. Stretching treatment step" as 2.2 times, setting the heating temperature in "1-2. Heat treatment step" as 200° C., and setting the reduction ratio in "1-3. Relaxation treatment step" as 3% lengthwise and 3% widthwise in Example 1, an unstretched film having a thickness of 100 μm and an edge length of 135 mm was used, the total stretching ratio in "1-1. Stretching treatment step" was set as 2.6 times (lengthwise direction: 1.61 times; widthwise direction: 1.61 times), the heating temperature in "1-2. Heat treatment step" was set as 220° C., and the reduction ratio in "1-3. Relaxation treatment step" was set as 4% lengthwise and 4% widthwise.

Example 7

Operations, measurements, and evaluations were performed in the same way as in Example 1 with the exception that instead of mixing 1.1 parts of the antioxidant with 100 parts of the hydrogenated product of the ring-opened polymer of dicyclopentadiene in "Production of unstretched film" in Example 1, 1.1 parts of the antioxidant and 0.05 parts of an anti-blocking agent (silica particles (particle diameter: 0.5 μm; produced by Admatechs Company Limited; product name: ADMAFINE Silica SC2500-SQ)) were mixed with 100 parts of the hydrogenated product of the ring-opened polymer of dicyclopentadiene in "Production of unstretched film".

Comparative Example 1

Operations, measurements, and evaluations were performed in the same way as in Example 1 with the exception that instead of using an unstretched film having a thickness of 50 μm and an edge length of 155 mm, setting the stretching temperature in "1-1. Stretching treatment step" as 110° C., setting the total stretching ratio in "1-1. Stretching treatment step" as 2.2 times, setting the stretching rate in "1-1. Stretching treatment step" as 200 mm/min, setting the heating time in "1-2. Heat treatment step" as 0.5 minutes, and performing "1-3. Relaxation treatment step" in Example 1, an unstretched film having a thickness of 150 μm and an edge length of 170 mm was used, the stretching temperature in "1-1. Stretching treatment step" was set as 100° C., the total stretching ratio in "1-1. Stretching treatment step" was set as 2.0 times (lengthwise direction: 1.41 times; widthwise direction: 1.41 times), the stretching rate in "1-1. Stretching treatment step" was set as 10,000 mm/min, the heating time in "1-2. Heat treatment step" was set as 20 minutes, and "1-3. Relaxation treatment step" was not performed.

Comparative Example 2

Operations, measurements, and evaluations were performed in the same way as in Example 1 with the exception that instead of using an unstretched film having a thickness of 50 μm and an edge length of 155 mm, setting the stretching temperature in "1-1. Stretching treatment step" as 110° C., setting the total stretching ratio in "1-1. Stretching treatment step" as 2.2 times, setting the stretching rate in "1-1. Stretching treatment step" as 200 mm/min, and setting the reduction ratio in "1-3. Relaxation treatment step" as 3% lengthwise and 3% widthwise in Example 1, an unstretched film having a thickness of 150 μm and an edge length of 170 mm was used, the stretching temperature in "1-1. Stretching treatment step" was set as 100° C., the total stretching ratio in "1-1. Stretching treatment step" was set as 2.0 times (lengthwise direction: 1.41 times; widthwise direction: 1.41 times), the stretching rate in "1-1. Stretching treatment step" was set as 10,000 mm/min, and the reduction ratio in "1-3. Relaxation treatment step" was set as 4% lengthwise and 3% widthwise.

Comparative Example 3

Operations, measurements, and evaluations were performed in the same way as in Comparative Example 1 with the exception that instead of using an unstretched film having a thickness of 150 μm and an edge length of 170 mm in Comparative Example 1, an unstretched film having a thickness of 50 μm and an edge length of 170 mm was used.

Comparative Example 4

Operations, measurements, and evaluations were performed in the same way as in Example 1 with the exception that instead of using an unstretched film having a thickness of 50 μm and an edge length of 155 mm, setting the stretching temperature in "1-1. Stretching treatment step" as 110° C., setting the total stretching ratio in "1-1. Stretching treatment step" as 2.2 times, setting the heating temperature in "1-2. Heat treatment step" as 200° C., setting the heating time in "1-2. Heat treatment step" as 0.5 minutes, and setting the relaxation temperature in "1-3. Relaxation treatment step" as 200° C. in Example 1, an unstretched film having a thickness of 100 μm and an edge length of 115 mm was used, the stretching temperature in "1-1. Stretching treatment step" was set as 130° C., the total stretching ratio in "1-1. Stretching treatment step" was set as 3.1 times (lengthwise direction: 1.76 times; widthwise direction: 1.76 times), the heating temperature in "1-2. Heat treatment step" was set as 240° C., the heating time in "1-2. Heat treatment step" was set as 20 minutes, and the relaxation temperature in "1-3. Relaxation treatment step" was set as 240° C.

Comparative Example 5

Operations, measurements, and evaluations were performed in the same way as in Example 1 with the exception that instead of using an unstretched film having a thickness of 50 μm and an edge length of 155 mm, setting the total stretching ratio in "1-1. Stretching treatment step" as 2.2 times, setting the heating time in "1-2. Heat treatment step" as 0.5 minutes, and setting the reduction ratio in "1-3. Relaxation treatment step" as 3% lengthwise and 3% widthwise in Example 1, an unstretched film having a thickness of 20 μm and an edge length of 235 mm was used, the total stretching ratio in "1-1. Stretching treatment step" was set as 1.4 times (lengthwise direction: 1.18 times; widthwise direction: 1.18 times), the heating time in "1-2. Heat treatment step" was set as 2 minutes, and the reduction ratio in "1-3. Relaxation treatment step" was set as 1% lengthwise and 1% widthwise.

Comparative Example 6

Operations, measurements, and evaluations were performed in the same way as in Example 1 with the exception that instead of setting the heating temperature in "1-2. Heat treatment step" as 200° C., setting the heating time in "1-2. Heat treatment step" as 0.5 minutes, and setting the relaxation temperature in "1-3. Relaxation treatment step" as 200° C. in Example 1, the heating temperature in "1-2. Heat treatment step" was set as 140° C., the heating time in "1-2. Heat treatment step" was set as 2 minutes, and the relaxation temperature in "1-3. Relaxation treatment step" was set as 140° C.

TABLE 1

| | | | Example 1 | Example 2 | Example 3 | Example 4 | Example 5 | Example 6 | Example 7 | Comparative Example 1 |
|---|---|---|---|---|---|---|---|---|---|---|
| Unstretched film | Thickness (μm) | | 50 | 100 | 25 | 20 | 20 | 100 | 50 | 150 |
| | Edge length (mm) | | 155 | 115 | 155 | 155 | 210 | 135 | 155 | 170 |
| Stretching treatment | Stretching temperature (° C.) | | 110 | 110 | 110 | 95 | 115 | 110 | 110 | 100 |
| | Stretching ratio (times) | | 2.2 | 3.1 | 2.2 | 2.2 | 1.6 | 2.6 | 2.2 | 2.0 |
| | Stretching rate (mm/min) | | 200 | 200 | 200 | 1000 | 200 | 200 | 200 | 10000 |
| Heat treatment | Heating temperature (° C.) | | 200 | 200 | 240 | 200 | 200 | 220 | 200 | 200 |
| | Heating time (min) | | 0.5 | 0.5 | 0.5 | 0.5 | 20 | 0.5 | 0.5 | 20 |
| Relaxation treatment | Relaxation temperature (° C.) | | 200 | 200 | 240 | 200 | 200 | 200 | 200 | — |
| | Relaxation time (min) | | 0.5 | 0.5 | 0.5 | 0.5 | 3 | 0.5 | 0.5 | — |
| | Reduction ratio (%) | Lengthwise | 3 | 5 | 3 | 3 | 1 | 4 | 3 | — |
| | | Widthwise | 3 | 5 | 3 | 3 | 1 | 4 | 3 | — |
| Softening point (° C.) | | | 260 | 260 | 260 | 260 | 260 | 260 | 260 | 260 |
| Heat shrinkage ratio (%) | | | 0.8 | 0.9 | 0.6 | 0.8 | 0.7 | 0.8 | 0.8 | 1.1 |
| Tan δ | | | 0.0004 | 0.0004 | 0.0004 | 0.0004 | 0.0004 | 0.0004 | 0.0004 | 0.0004 |
| Coefficient of static friction | | | 0.89 | 0.9 | 0.84 | 0.98 | 0.85 | 0.9 | 0.86 | 0.53 |
| Plane orientation factor | | | 0.013 | 0.015 | 0.012 | 0.018 | 0.011 | 0.012 | 0.013 | 0.013 |
| Density (g/cm$^3$) | | | 1.0359 | 1.0349 | 1.0320 | 1.0441 | 1.0301 | 1.0354 | 1.0357 | 1.0348 |
| Thickness (μm) | | | 10 | 10 | 5 | 4 | 8 | 15 | 10 | 37 |
| Evaluation of fundamental physical properties | Dielectric breakdown strength (kV/mm) | 23° C. | 500 | 444 | 429 | 460 | 470 | 364 | 503 | 410 |
| | | 120° C. | 381 | 452 | 379 | 381 | 381 | 291 | 375 | 356 |
| | | 150° C. | 330 | 417 | 362 | 391 | 376 | 248 | 428 | 380 |
| | Retention (%) | 120° C. | 76 | 102 | 88 | 83 | 81 | 80 | 75 | 87 |
| | | 150° C. | 66 | 94 | 84 | 85 | 80 | 68 | 85 | 92 |
| | Evaluation result | | Good | Good | Good | Good | Good | Good | Good | Good |
| Evaluation of process suitability | Metal vapor deposition properties | | Good | Good | Good | Good | Good | Good | Good | Poor |
| | Formability | | Good | Good | Excellent | Excellent | Excellent | Good | Good | Poor |

| | | | Comparative Example 2 | Comparative Example 3 | Comparative Example 4 | Comparative Example 5 | Comparative Example 6 |
|---|---|---|---|---|---|---|---|
| Unstretched film | Thickness (μm) | | 150 | 50 | 100 | 20 | 50 |
| | Edge length (mm) | | 170 | 170 | 115 | 235 | 155 |
| Stretching treatment | Stretching temperature (° C.) | | 100 | 100 | 130 | 110 | 110 |
| | Stretching ratio (times) | | 2.0 | 2.0 | 3.1 | 1.4 | 2.2 |
| | Stretching rate (mm/min) | | 10000 | 10000 | 200 | 200 | 200 |
| Heat treatment | Heating temperature (° C.) | | 200 | 200 | 240 | 200 | 140 |
| | Heating time (min) | | 0.5 | 20 | 20 | 2 | 2 |
| Relaxation treatment | Relaxation temperature (° C.) | | 200 | — | 240 | 200 | 140 |
| | Relaxation time (min) | | 0.5 | — | 0.5 | 0.5 | 0.5 |
| | Reduction ratio (%) | Lengthwise | 4 | — | 3 | 1 | 3 |
| | | Widthwise | 3 | — | 3 | 1 | 3 |
| Softening point (° C.) | | | 260 | 260 | 260 | 260 | 250 |
| Heat shrinkage ratio (%) | | | 0.7 | 5.6 | 0.9 | 0.7 | 6.8 |
| Tan δ | | | 0.0004 | 0.0004 | 0.0004 | 0.0004 | 0.0004 |
| Coefficient of static friction | | | 0.98 | 0.95 | 0.54 | 0.78 | 0.88 |
| Plane orientation factor | | | 0.015 | 0.016 | 0.007 | 0.006 | 0.010 |
| Density (g/cm$^3$) | | | 1.0361 | 1.0355 | 1.0325 | 1.0341 | 1.0240 |
| Thickness (μm) | | | 37 | 13 | 10 | 10 | 10 |
| Evaluation of fundamental physical properties | Dielectric breakdown strength (kV/mm) | 23° C. | 287 | 351 | 434 | 437 | 401 |
| | | 120° C. | 243 | 260 | 356 | 386 | 321 |
| | | 150° C. | 175 | 239 | 202 | 227 | 204 |
| | Retention (%) | 120° C. | 84 | 74 | 82 | 88 | 80 |
| | | 150° C. | 61 | 68 | 47 | 52 | 51 |
| | Evaluation result | | Good | Good | Poor | Poor | Poor |
| Evaluation of process suitability | Metal vapor deposition properties | | Good | Poor | Mediocre | Mediocre | Poor |
| | Formability | | Poor | Poor | Good | Good | Poor |

It can be seen from Table 1 that the films for a capacitor of Examples 1 to 7, which each contain a hydrogenated dicyclopentadiene ring-opened polymer that is crystalline and have a heat shrinkage ratio of not less than 0.01% and not more than 1.0% when heated at 200° C. for 10 minutes, a plane orientation factor of 0.01 or more, a density of $1.03\times10^6$ g/m$^3$ or more, and a thickness of 15.0 μm or less, can improve dielectric strength retention at high temperatures and can also improve metal vapor deposition properties and formability compared to the films for a capacitor of Comparative Examples 1 to 6.

Note that since the heat shrinkage ratio in Comparative Example 3 was 5.6%, vapor deposition heat caused sagging of the film for a capacitor, and formability decreased.

INDUSTRIAL APPLICABILITY

According to the present disclosure, it is possible to provide a film for a capacitor that can improve dielectric strength retention at high temperatures and can also improve metal vapor deposition properties and formability.

Moreover, according to the present disclosure, it is possible to provide a method of producing a film for a capacitor that can improve metal vapor deposition properties and formability of a film for a capacitor having high dielectric strength retention at high temperatures and that enables efficient production thereof.

REFERENCE SIGNS LIST 10 stretched film (web of film)
11 edge of stretched film
12 edge of stretched film
13 edge of stretched film
14 edge of stretched film
20 heated and stretched film (crystallized film)
21 edge of heated and stretched film
22 edge of heated and stretched film
23 edge of heated and stretched film
24 edge of heated and stretched film
100 holding device
110 frame
121 clips
122 clips
123 clips
124 clips

The invention claimed is:

1. A film for a capacitor comprising a hydrogenated dicyclopentadiene ring-opened polymer that is crystalline, and having:
   a heat shrinkage ratio of not less than 0.01% and not more than 1.0% when heated at 200° C. for 10 minutes;
   a plane orientation factor of 0.01 or more;
   a density of $1.03\times10^6$ g/m$^3$ or more; and
   a thickness of 15.0 μm or less.

2. A method of producing the film for a capacitor according to claim 1, comprising:
   a stretching treatment step of performing stretching treatment of an unstretched film under conditions of a stretching temperature of not lower than a glass-transition temperature Tg of the hydrogenated dicyclopentadiene ring-opened polymer and not higher than a melting point Tm of the hydrogenated dicyclopentadiene ring-opened polymer and a stretching ratio of not less than 1.5 times and not more than 10 times;
   a heat treatment step of performing heat treatment of a stretched film that has been stretched through the stretching treatment step under conditions of a heating temperature of not lower than 150° C. and not higher than 240° C. and a heating time of not less than 0.1 minutes and not more than 600 minutes; and
   a relaxation treatment step of performing relaxation treatment of the stretched film that has been heated through the heat treatment step under conditions of a relaxation temperature of not lower than 150° C. and not higher than 240° C. and a relaxation time of not less than 0.1 minutes and not more than 600 minutes with a reduction ratio of film fixed width of more than 0% and not more than 20%.

\* \* \* \* \*